(12) United States Patent
Della Penna

(10) Patent No.: US 11,022,971 B2
(45) Date of Patent: Jun. 1, 2021

(54) EVENT DATA RECORDATION TO IDENTIFY AND RESOLVE ANOMALIES ASSOCIATED WITH CONTROL OF DRIVERLESS VEHICLES

(71) Applicant: NIO USA, Inc., San Jose, CA (US)

(72) Inventor: Mauro Della Penna, San Francisco, CA (US)

(73) Assignee: NIO USA, Inc., San Jose, CA (US)

( * ) Notice: Subject to any disclaimer, the term of this patent is extended or adjusted under 35 U.S.C. 154(b) by 423 days.

(21) Appl. No.: 15/872,555

(22) Filed: Jan. 16, 2018

(65) Prior Publication Data

US 2019/0220011 A1   Jul. 18, 2019

(51) Int. Cl.
  *G05D 1/00* (2006.01)
  *G07C 5/00* (2006.01)
  (Continued)

(52) U.S. Cl.
  CPC ......... *G05D 1/0088* (2013.01); *G05D 1/0212* (2013.01); *G06F 8/65* (2013.01);
  (Continued)

(58) Field of Classification Search
  CPC ............... G05D 1/0088; G05D 1/0212; G05D 2201/0213; G07C 5/085; G07C 5/0841;
  (Continued)

(56) References Cited

U.S. PATENT DOCUMENTS 3,790,277 A   2/1974 Hogan
4,154,529 A   5/1979 Dyott
(Continued)

FOREIGN PATENT DOCUMENTS

EP   2410358   1/2012
EP   2524843   11/2012
(Continued)

OTHER PUBLICATIONS

"Meet the EZ10, the driverless shuttle", Easymile.com, retrieved from https://web.archive.org/web/20150723060050/http://easymile.com, Jul. 2015, 3 pages.
(Continued)

*Primary Examiner* — Jonathan M Dager
*Assistant Examiner* — Jean W Charleston
(74) *Attorney, Agent, or Firm* — Sheridan Ross P.C.

(57) ABSTRACT

Various embodiments relate to recording event data to identify and resolve anomalies associated with control of driverless vehicles. Some examples include computing vehicular drive parameters to facilitate driverless transit, monitoring control signals, detecting an event, triggering storage of event data, determining transmission control criteria, and transmitting the event data based on the transmission control criteria. Other examples include receiving event data via a communications network from an autonomous vehicle, identifying a computed vehicular drive parameter, extracting sensor data associated with the event, detecting application of control signals, analyzing the control signals, the sensor data, and the subset of computed vehicular drive parameters to identify a type of event, and generating update executable instructions responsive to the type of event.

24 Claims, 8 Drawing Sheets

(51) Int. Cl.
*G07C 5/08* (2006.01)
*G06N 3/08* (2006.01)
*G06F 8/65* (2018.01)
*G06K 9/00* (2006.01)
*G05D 1/02* (2020.01)

(52) U.S. Cl.
CPC ........... *G06K 9/00805* (2013.01); *G06N 3/08* (2013.01); *G07C 5/008* (2013.01); *G07C 5/085* (2013.01); *G07C 5/0841* (2013.01); *G05D 2201/0213* (2013.01)

(58) Field of Classification Search
CPC ...... G07C 5/008; G06K 9/00805; G06F 8/65; G06N 3/08; G06N 3/0454; G06N 20/00; G08G 1/0129; G08G 1/0133; G08G 1/0112; B60W 40/10
USPC .......................................................... 701/23
See application file for complete search history.

(56) References Cited

U.S. PATENT DOCUMENTS

| | | |
|---|---|---|
| 4,361,202 A | 11/1982 | Minovitch |
| 4,516,158 A | 5/1985 | Grainge et al. |
| 4,700,301 A | 10/1987 | Dyke |
| 4,709,195 A | 11/1987 | Hellekson et al. |
| 5,098,185 A | 3/1992 | Watanabe et al. |
| 5,202,742 A | 4/1993 | Frank et al. |
| 5,220,507 A | 6/1993 | Kirson |
| 5,303,084 A | 4/1994 | Pflibsen et al. |
| 5,337,189 A | 8/1994 | Krawczyk et al. |
| 5,375,059 A | 12/1994 | Kyrtsos et al. |
| 5,390,125 A | 2/1995 | Sennott et al. |
| 5,428,438 A | 6/1995 | Komine |
| 5,438,517 A | 8/1995 | Sennott et al. |
| 5,548,516 A | 8/1996 | Gudat et al. |
| 5,555,503 A | 9/1996 | Kyrtsos et al. |
| 5,558,370 A | 9/1996 | Behr |
| 5,610,815 A | 3/1997 | Gudat et al. |
| 5,612,883 A | 3/1997 | Shaffer et al. |
| 5,615,116 A | 5/1997 | Gudat et al. |
| 5,629,855 A | 5/1997 | Kyrtsos et al. |
| 5,640,323 A | 6/1997 | Kleimenhagen et al. |
| 5,646,843 A | 7/1997 | Gudat et al. |
| 5,646,845 A | 7/1997 | Gudat et al. |
| 5,648,901 A | 7/1997 | Gudat et al. |
| 5,657,226 A | 8/1997 | Shin et al. |
| 5,680,306 A | 10/1997 | Shin et al. |
| 5,680,313 A | 10/1997 | Whittaker et al. |
| 5,684,696 A | 11/1997 | Rao et al. |
| 5,703,351 A | 12/1997 | Meyers |
| 5,838,562 A | 11/1998 | Gudat et al. |
| 5,956,250 A | 9/1999 | Gudat et al. |
| 5,959,552 A | 9/1999 | Cho |
| 6,046,800 A | 4/2000 | Ohtomo et al. |
| 6,115,128 A | 9/2000 | Vann |
| 6,122,572 A | 9/2000 | Yavnai |
| 6,151,539 A | 11/2000 | Bergholz et al. |
| 6,264,353 B1 | 7/2001 | Caraher et al. |
| 6,301,542 B1 | 10/2001 | Kirchberger et al. |
| 6,374,168 B1 | 4/2002 | Fujii |
| 6,438,472 B1 | 8/2002 | Tano et al. |
| 6,502,016 B1 | 12/2002 | Ozaki et al. |
| 6,626,463 B1 | 9/2003 | Arima et al. |
| 6,728,616 B1 | 4/2004 | Tabe |
| 6,749,218 B2 | 6/2004 | Breed |
| 6,752,508 B2 | 6/2004 | Kobayashi |
| 6,778,732 B1 | 8/2004 | Fermann |
| 6,816,971 B2 | 11/2004 | Schmidt et al. |
| 7,036,128 B1 | 4/2006 | Julia et al. |
| 7,069,780 B2 | 7/2006 | Ander |
| 7,089,114 B1 | 8/2006 | Huang |
| 7,106,180 B1 | 9/2006 | Pompei |
| 7,164,117 B2 | 1/2007 | Breed et al. |
| 7,248,342 B1 | 7/2007 | Degnan |
| 7,255,275 B2 | 8/2007 | Gurevich et al. |
| 7,259,838 B2 | 8/2007 | Carlhoff et al. |
| 7,311,000 B2 | 12/2007 | Smith et al. |
| 7,361,948 B2 | 4/2008 | Hirano et al. |
| 7,417,716 B2 | 8/2008 | Nagasaka et al. |
| 7,426,429 B2 | 9/2008 | Tabe |
| 7,451,005 B2 | 11/2008 | Hoffberg et al. |
| 7,544,945 B2 | 6/2009 | Tan et al. |
| 7,663,502 B2 | 2/2010 | Breed |
| 7,865,277 B1 | 1/2011 | Larson et al. |
| 7,969,558 B2 | 6/2011 | Hall |
| 7,979,175 B2 | 7/2011 | Allard et al. |
| 8,050,863 B2 | 11/2011 | Trepagnier et al. |
| 8,123,642 B2 | 2/2012 | Ishikawa et al. |
| 8,126,642 B2 | 2/2012 | Trepaginer et al. |
| 8,346,480 B2 | 1/2013 | Trepagnier et al. |
| 8,428,863 B2 | 4/2013 | Kelly et al. |
| 8,428,864 B2 | 4/2013 | Kelly et al. |
| 8,392,064 B2 | 5/2013 | Thrun et al. |
| 8,434,919 B2 | 5/2013 | Schofield |
| 8,447,509 B2 | 5/2013 | Kelly et al. |
| 8,457,877 B2 | 6/2013 | Kelly et al. |
| 8,477,290 B2 | 7/2013 | Yamada |
| 8,550,196 B2 | 10/2013 | Ross |
| 8,583,358 B2 | 11/2013 | Kelly et al. |
| 8,589,014 B2 | 11/2013 | Fairfield et al. |
| 8,589,062 B2 | 11/2013 | Kelly et al. |
| 8,670,891 B1 | 3/2014 | Szybalski et al. |
| 8,742,325 B1 | 6/2014 | Droz et al. |
| 8,755,837 B2 | 6/2014 | Rhoads et al. |
| 8,767,190 B2 | 7/2014 | Hall |
| 8,788,446 B2 | 7/2014 | Yao et al. |
| 8,825,259 B1 | 9/2014 | Ferguson |
| 8,836,922 B1 | 9/2014 | Pennecot et al. |
| 8,880,272 B1 | 11/2014 | Ferguson et al. |
| 8,886,382 B2 | 11/2014 | Nettleton et al. |
| 8,892,496 B2 | 11/2014 | Yao et al. |
| 8,909,428 B1 | 12/2014 | Lombrozo |
| 8,930,128 B2 | 1/2015 | Kim et al. |
| 8,977,007 B1 | 3/2015 | Ferguson et al. |
| 8,996,224 B1 | 3/2015 | Herbach et al. |
| 8,965,578 B2 | 4/2015 | Versteeg et al. |
| 9,008,890 B1 | 4/2015 | Herbach et al. |
| 9,031,729 B2 | 5/2015 | Lathrop et al. |
| 9,046,371 B2 | 6/2015 | Casson et al. |
| 9,086,273 B1 | 7/2015 | Gruver et al. |
| 9,139,199 B2 | 9/2015 | Harvey |
| 9,146,553 B2 | 9/2015 | Nettleton et al. |
| D743,978 S | 11/2015 | Amin |
| 9,182,942 B2 | 11/2015 | Kelly et al. |
| 9,188,985 B1 | 11/2015 | Hobbs et al. |
| 9,194,168 B1 | 11/2015 | Lu et al. |
| 9,201,426 B1 | 12/2015 | Bonawitz |
| 9,213,934 B1 | 12/2015 | Versteeg et al. |
| 9,285,464 B2 | 3/2016 | Pennecot et al. |
| 9,290,201 B1 | 3/2016 | Lombrozo |
| 9,297,256 B2 | 3/2016 | Nettleton et al. |
| 9,315,212 B1 | 4/2016 | Kyrtsos et al. |
| 9,317,033 B2 | 4/2016 | Ibanez-Guzman et al. |
| 9,347,779 B1 | 5/2016 | Lynch |
| 9,367,065 B2 | 6/2016 | Dolgov et al. |
| 9,368,026 B1 | 6/2016 | Herbach et al. |
| 9,368,936 B1 | 6/2016 | Lenius et al. |
| 9,298,186 B2 | 7/2016 | Harvey |
| 9,382,797 B2 | 7/2016 | Nettleton et al. |
| 9,384,443 B2 | 7/2016 | Passot et al. |
| 9,384,666 B1 | 7/2016 | Harvey |
| 9,395,727 B1 | 7/2016 | Smith et al. |
| 9,396,441 B1 | 7/2016 | Rubin |
| 9,441,971 B2 | 9/2016 | Casson et al. |
| 9,459,622 B2 | 10/2016 | Abhyanker |
| 9,476,303 B2 | 10/2016 | Nettleton et al. |
| 9,494,439 B1 | 11/2016 | Ross et al. |
| 9,494,940 B1 | 11/2016 | Kentley |
| 9,494,943 B2 | 11/2016 | Harvey |
| 9,506,763 B2 | 11/2016 | Averbuch et al. |
| 9,507,346 B1 | 11/2016 | Levinson et al. |
| 9,517,767 B1 | 12/2016 | Kentley et al. |

(56) References Cited

U.S. PATENT DOCUMENTS

| | | |
|---|---|---|
| 9,522,699 B2 | 12/2016 | Raad et al. |
| 9,533,640 B2 | 1/2017 | Rai |
| 9,547,307 B1 | 1/2017 | Cullinane et al. |
| 9,606,539 B1 | 3/2017 | Kentley et al. |
| 9,612,123 B1 | 4/2017 | Levinson et al. |
| 9,613,274 B2 | 4/2017 | Stevens et al. |
| 9,630,619 B1 | 4/2017 | Kentley et al. |
| 9,632,502 B1 | 4/2017 | Levinson et al. |
| 9,701,239 B2 | 7/2017 | Kentley et al. |
| 9,963,106 B1 | 5/2018 | Ricci |
| 2001/0029425 A1 | 10/2001 | Myr |
| 2002/0131608 A1 | 9/2002 | Lobb et al. |
| 2002/0140924 A1 | 10/2002 | Wrangler et al. |
| 2003/0046021 A1 | 3/2003 | Lasky et al. |
| 2004/0017073 A1 | 1/2004 | Pavlov et al. |
| 2004/0068354 A1 | 4/2004 | Tabe |
| 2004/0168837 A1 | 9/2004 | Michaud et al. |
| 2004/0193374 A1 | 9/2004 | Hac et al. |
| 2004/0250614 A1 | 12/2004 | Ander |
| 2004/0264207 A1 | 12/2004 | Jones |
| 2005/0046584 A1 | 3/2005 | Breed |
| 2005/0107955 A1 | 5/2005 | Isaji et al. |
| 2005/0216181 A1 | 9/2005 | Estkowski et al. |
| 2006/0030987 A1 | 2/2006 | Akita |
| 2006/0064202 A1 | 3/2006 | Gutmann et al. |
| 2006/0070432 A1 | 4/2006 | Ander |
| 2006/0089763 A1 | 4/2006 | Barrett et al. |
| 2006/0175116 A1 | 8/2006 | Friedman et al. |
| 2006/0178795 A1* | 8/2006 | Queveau .............. B60J 7/0573 701/49 |
| 2006/0207820 A1 | 9/2006 | Joshi et al. |
| 2006/0208169 A1 | 9/2006 | Breed et al. |
| 2007/0096447 A1 | 5/2007 | Tabe |
| 2007/0246927 A1 | 10/2007 | Okada |
| 2008/0033645 A1 | 2/2008 | Levinson et al. |
| 2008/0084283 A1 | 4/2008 | Kalik |
| 2008/0097699 A1 | 4/2008 | Ono |
| 2008/0161987 A1 | 7/2008 | Breed |
| 2008/0309468 A1 | 12/2008 | Greene et al. |
| 2008/0316463 A1 | 12/2008 | Okada et al. |
| 2008/0320421 A1 | 12/2008 | Demaris et al. |
| 2009/0029826 A1 | 1/2009 | Eguchi et al. |
| 2009/0036090 A1 | 2/2009 | Cho et al. |
| 2009/0208109 A1 | 8/2009 | Kakinami et al. |
| 2009/0240647 A1 | 9/2009 | Green et al. |
| 2009/0243825 A1* | 10/2009 | Schofield .......... G06K 9/00798 340/435 |
| 2009/0276149 A1 | 11/2009 | Kauffman et al. |
| 2010/0045482 A1 | 2/2010 | Strauss |
| 2010/0106356 A1 | 4/2010 | Trepagnier et al. |
| 2010/0220141 A1 | 9/2010 | Ozawa |
| 2010/0235129 A1 | 9/2010 | Sharma et al. |
| 2010/0274449 A1 | 10/2010 | Yonak et al. |
| 2010/0275829 A1 | 11/2010 | Sporsheim |
| 2010/0292544 A1 | 11/2010 | Sherman et al. |
| 2010/0302528 A1 | 12/2010 | Hall |
| 2011/0029235 A1 | 2/2011 | Berry |
| 2011/0071718 A1* | 3/2011 | Norris ................ G05B 19/414 701/23 |
| 2011/0122729 A1 | 5/2011 | Hu et al. |
| 2011/0130111 A1 | 6/2011 | Crandall et al. |
| 2011/0199199 A1 | 8/2011 | Perkins |
| 2011/0216304 A1 | 9/2011 | Hall |
| 2011/0241862 A1 | 10/2011 | Debouk et al. |
| 2011/0255070 A1 | 10/2011 | Phillips et al. |
| 2011/0288684 A1 | 11/2011 | Farlow et al. |
| 2012/0035846 A1 | 2/2012 | Sakamoto et al. |
| 2012/0044043 A1 | 2/2012 | Nettleton et al. |
| 2012/0046818 A1 | 2/2012 | Nettleton et al. |
| 2012/0046927 A1 | 2/2012 | Nettleton et al. |
| 2012/0046983 A1 | 2/2012 | Nettleton et al. |
| 2012/0053703 A1 | 3/2012 | Nettleton et al. |
| 2012/0053775 A1 | 3/2012 | Nettleton et al. |
| 2012/0083960 A1 | 4/2012 | Zhu et al. |
| 2012/0136561 A1 | 5/2012 | Barker et al. |
| 2012/0163670 A1 | 6/2012 | Eaton et al. |
| 2012/0193153 A1 | 8/2012 | Wellborn et al. |
| 2012/0226391 A1 | 9/2012 | Fryer et al. |
| 2012/0256448 A1 | 10/2012 | Yasui et al. |
| 2012/0310465 A1 | 12/2012 | Boatright et al. |
| 2013/0006451 A1 | 1/2013 | Cooper et al. |
| 2013/0046421 A1 | 2/2013 | El Fassi et al. |
| 2013/0054133 A1 | 2/2013 | Lewis et al. |
| 2013/0060412 A1 | 3/2013 | Nakagawara et al. |
| 2013/0063600 A1* | 3/2013 | Pawlicki .............. B60W 10/04 348/148 |
| 2013/0131908 A1 | 5/2013 | Trepagnier et al. |
| 2013/0144476 A1 | 6/2013 | Pinot et al. |
| 2013/0245877 A1 | 9/2013 | Ferguson et al. |
| 2013/0246301 A1 | 9/2013 | Radhakrishnan et al. |
| 2013/0268138 A1 | 10/2013 | Moughler et al. |
| 2013/0273968 A1 | 10/2013 | Rhoads et al. |
| 2013/0338855 A1* | 12/2013 | Mason ................ G07C 5/0816 701/2 |
| 2013/0343071 A1 | 12/2013 | Nagaoka et al. |
| 2014/0032012 A1 | 1/2014 | Joshi et al. |
| 2014/0032049 A1 | 1/2014 | Moshchuk et al. |
| 2014/0088855 A1 | 3/2014 | Ferguson |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0132407 A1 | 5/2014 | Kumai et al. |
| 2014/0142830 A1 | 5/2014 | Bernzen et al. |
| 2014/0185880 A1 | 7/2014 | Fairfield et al. |
| 2014/0188343 A1 | 7/2014 | Yoshimura et al. |
| 2014/0188347 A1 | 7/2014 | Tabe |
| 2014/0210646 A1 | 7/2014 | Subramanya |
| 2014/0214255 A1 | 7/2014 | Dolgov et al. |
| 2014/0214260 A1 | 7/2014 | Eckert et al. |
| 2014/0218527 A1 | 8/2014 | Subramanya |
| 2014/0244151 A1 | 8/2014 | Matsubara et al. |
| 2014/0257661 A1 | 9/2014 | Schulman et al. |
| 2014/0297182 A1 | 10/2014 | Casson et al. |
| 2014/0303827 A1 | 10/2014 | Dolgov et al. |
| 2014/0309833 A1 | 10/2014 | Ferguson et al. |
| 2014/0333468 A1 | 11/2014 | Zhu et al. |
| 2014/0336935 A1 | 11/2014 | Zhu et al. |
| 2014/0343750 A1 | 11/2014 | Minemura et al. |
| 2014/0350790 A1 | 11/2014 | Akesson et al. |
| 2014/0358353 A1 | 12/2014 | Ibanez-Guzman et al. |
| 2014/0358427 A1 | 12/2014 | Fuhrman |
| 2014/0365228 A1 | 12/2014 | Ng-Thow-Hing et al. |
| 2014/0370911 A1 | 12/2014 | Gorgenyi et al. |
| 2015/0006005 A1 | 1/2015 | Yu et al. |
| 2015/0012166 A1 | 1/2015 | Hauler et al. |
| 2015/0025708 A1 | 1/2015 | Anderson |
| 2015/0039157 A1 | 2/2015 | Wolfe et al. |
| 2015/0039167 A1 | 2/2015 | Ideshio et al. |
| 2015/0039391 A1 | 2/2015 | Hershkovitz et al. |
| 2015/0057871 A1 | 2/2015 | Ono et al. |
| 2015/0061895 A1 | 3/2015 | Ricci |
| 2015/0091374 A1 | 4/2015 | Lenius et al. |
| 2015/0094850 A1 | 4/2015 | Passot et al. |
| 2015/0127224 A1 | 5/2015 | Tabe |
| 2015/0127239 A1 | 5/2015 | Breed et al. |
| 2015/0131080 A1 | 5/2015 | Retterath et al. |
| 2015/0149019 A1 | 5/2015 | Pilutti et al. |
| 2015/0149022 A1 | 5/2015 | Harvey |
| 2015/0149088 A1 | 5/2015 | Attard et al. |
| 2015/0154545 A1 | 6/2015 | Skaaksrud et al. |
| 2015/0154546 A1 | 6/2015 | Skaaksrud et al. |
| 2015/0154554 A1 | 6/2015 | Skaaksrud |
| 2015/0154585 A1 | 6/2015 | Skaaksrud |
| 2015/0156253 A1 | 6/2015 | Skaaksrud et al. |
| 2015/0156254 A1 | 6/2015 | Skaaksrud |
| 2015/0156718 A1 | 6/2015 | Skaaksrud |
| 2015/0160024 A1 | 6/2015 | Fowe |
| 2015/0178998 A1 | 6/2015 | Attard et al. |
| 2015/0185034 A1 | 7/2015 | Abhyanker |
| 2015/0198445 A1 | 7/2015 | Casson et al. |
| 2015/0234387 A1 | 8/2015 | Mullan et al. |
| 2015/0248131 A1 | 9/2015 | Fairfield et al. |
| 2015/0248689 A1 | 9/2015 | Paul et al. |

(56) References Cited

U.S. PATENT DOCUMENTS

| | | | |
|---|---|---|---|
| 2015/0253775 A1* | 9/2015 | Jacobus | G01S 7/497 |
| | | | 701/23 |
| 2015/0254986 A1 | 9/2015 | Fairfield et al. | |
| 2015/0258928 A1 | 9/2015 | Goto et al. | |
| 2015/0266488 A1 | 9/2015 | Solyom et al. | |
| 2015/0268665 A1 | 9/2015 | Ludwick et al. | |
| 2015/0271290 A1 | 9/2015 | Tao et al. | |
| 2015/0285645 A1 | 10/2015 | Maise et al. | |
| 2015/0292894 A1 | 10/2015 | Goddard et al. | |
| 2015/0293228 A1 | 10/2015 | Retterath et al. | |
| 2015/0298636 A1 | 10/2015 | Furst | |
| 2015/0321606 A1 | 11/2015 | Vartanian et al. | |
| 2015/0331422 A1 | 11/2015 | Hartung et al. | |
| 2015/0336502 A1 | 11/2015 | Hillis et al. | |
| 2015/0336524 A1 | 11/2015 | Larner et al. | |
| 2015/0338226 A1 | 11/2015 | Mason et al. | |
| 2015/0338852 A1 | 11/2015 | Ramanujam | |
| 2015/0339928 A1 | 11/2015 | Ramanujam | |
| 2015/0346727 A1 | 12/2015 | Ramanujam | |
| 2015/0348221 A1 | 12/2015 | Pedersen et al. | |
| 2015/0356368 A1 | 12/2015 | Liu et al. | |
| 2015/0359032 A1 | 12/2015 | Menard et al. | |
| 2015/0370251 A1 | 12/2015 | Siegel et al. | |
| 2015/0370255 A1 | 12/2015 | Harvey | |
| 2015/0375764 A1 | 12/2015 | Rajendran et al. | |
| 2016/0009291 A1 | 1/2016 | Pallett et al. | |
| 2016/0016312 A1 | 1/2016 | Lawrence, III et al. | |
| 2016/0016315 A1 | 1/2016 | Kuffner, Jr. et al. | |
| 2016/0047660 A1* | 2/2016 | Fausten | G05D 1/0088 |
| | | | 701/25 |
| 2016/0047901 A1 | 2/2016 | Pacala et al. | |
| 2016/0071278 A1 | 3/2016 | Leonard et al. | |
| 2016/0033963 A1 | 4/2016 | Noh | |
| 2016/0101811 A1 | 4/2016 | Kyrtsos et al. | |
| 2016/0107509 A1 | 4/2016 | Kirsch et al. | |
| 2016/0107703 A1 | 4/2016 | Briceno et al. | |
| 2016/0129787 A1 | 5/2016 | Netzer | |
| 2016/0159402 A1 | 6/2016 | Nakaya et al. | |
| 2016/0159407 A1 | 6/2016 | Holmstrom et al. | |
| 2016/0167608 A1 | 6/2016 | Rai | |
| 2016/0169683 A1 | 6/2016 | Lynch | |
| 2016/0171521 A1 | 6/2016 | Ramirez et al. | |
| 2016/0171637 A1 | 6/2016 | Rai | |
| 2016/0171894 A1 | 6/2016 | Harvey | |
| 2016/0178381 A1 | 6/2016 | Lynch | |
| 2016/0187150 A1 | 6/2016 | Sherman et al. | |
| 2016/0189544 A1 | 6/2016 | Ricci | |
| 2016/0207454 A1 | 7/2016 | Cuddihy et al. | |
| 2016/0209220 A1 | 7/2016 | Laetz | |
| 2016/0221186 A1 | 8/2016 | Perrone | |
| 2016/0223343 A1 | 8/2016 | Averbuch et al. | |
| 2016/0224028 A1 | 8/2016 | Harvey | |
| 2016/0229451 A1 | 8/2016 | Raad et al. | |
| 2016/0247106 A1 | 8/2016 | Dalloro et al. | |
| 2016/0247109 A1 | 8/2016 | Scicluna et al. | |
| 2016/0247394 A1 | 8/2016 | Stenneth | |
| 2016/0251016 A1 | 9/2016 | Pallett et al. | |
| 2016/0265930 A1 | 9/2016 | Thakur | |
| 2016/0266581 A1 | 9/2016 | Dolgov et al. | |
| 2016/0274590 A1 | 9/2016 | Harvey | |
| 2016/0280258 A1 | 9/2016 | Lavoie et al. | |
| 2016/0280267 A1 | 9/2016 | Lavoie et al. | |
| 2016/0334797 A1 | 11/2016 | Ross et al. | |
| 2016/0347329 A1 | 12/2016 | Zelman et al. | |
| 2016/0355092 A1 | 12/2016 | Higuchi et al. | |
| 2016/0358475 A1 | 12/2016 | Prokhorov | |
| 2016/0362045 A1 | 12/2016 | Vegt et al. | |
| 2016/0368492 A1 | 12/2016 | Al-Stouhi | |
| 2016/0370194 A1 | 12/2016 | Colijn et al. | |
| 2016/0371979 A1 | 12/2016 | Casson et al. | |
| 2017/0028966 A1 | 2/2017 | Elie et al. | |
| 2017/0030127 A1 | 2/2017 | Elie et al. | |
| 2017/0030128 A1 | 2/2017 | Elie et al. | |
| 2017/0030134 A1 | 2/2017 | Elie et al. | |
| 2017/0030135 A1 | 2/2017 | Elie et al. | |
| 2017/0030737 A1 | 2/2017 | Elie et al. | |
| 2017/0032599 A1 | 2/2017 | Elie et al. | |
| 2017/0060234 A1 | 3/2017 | Sung | |
| 2017/0067747 A1 | 3/2017 | Ricci | |
| 2017/0075358 A1 | 3/2017 | Zhang | |
| 2017/0120753 A1 | 5/2017 | Kentley | |
| 2017/0120803 A1 | 5/2017 | Kentley et al. | |
| 2017/0120804 A1 | 5/2017 | Kentley et al. | |
| 2017/0120814 A1 | 5/2017 | Kentley et al. | |
| 2017/0120902 A1 | 5/2017 | Kentley et al. | |
| 2017/0120904 A1 | 5/2017 | Kentley et al. | |
| 2017/0123419 A1 | 5/2017 | Levinson et al. | |
| 2017/0123421 A1 | 5/2017 | Kentley et al. | |
| 2017/0123422 A1 | 5/2017 | Kentley et al. | |
| 2017/0123428 A1 | 5/2017 | Levinson et al. | |
| 2017/0123429 A1 | 5/2017 | Levinson et al. | |
| 2017/0124476 A1 | 5/2017 | Levinson et al. | |
| 2017/0124781 A1 | 5/2017 | Levinson et al. | |
| 2017/0126810 A1 | 5/2017 | Kentley et al. | |
| 2017/0129335 A1 | 5/2017 | Lu et al. | |
| 2017/0132334 A1 | 5/2017 | Levinson et al. | |
| 2017/0132934 A1 | 5/2017 | Kentley et al. | |
| 2017/0136842 A1 | 5/2017 | Anderson et al. | |
| 2017/0144669 A1* | 5/2017 | Spata | E01C 23/01 |
| 2017/0171375 A1 | 6/2017 | Kamata | |
| 2017/0351261 A1* | 12/2017 | Levinson | G01S 13/86 |
| 2017/0352215 A1 | 12/2017 | Maiwand et al. | |
| 2018/0024564 A1* | 1/2018 | Matsuda | G05D 1/0214 |
| | | | 701/25 |
| 2018/0259966 A1* | 9/2018 | Long | G08G 1/00 |
| 2018/0276911 A1* | 9/2018 | McAfee | G07C 5/008 |
| 2018/0284292 A1* | 10/2018 | Ono | G01S 19/22 |
| 2020/0274929 A1* | 8/2020 | Binder | H04L 67/12 |

FOREIGN PATENT DOCUMENTS

| | | |
|---|---|---|
| EP | 2549456 | 1/2013 |
| EP | 2626760 | 8/2013 |
| GB | 2460916 | 12/2009 |
| GB | 2520493 | 5/2015 |
| JP | 2011248855 | 12/2011 |
| RU | 2269813 | 2/2006 |
| RU | 103114 | 3/2011 |
| RU | 140935 | 5/2014 |
| WO | WO 1993/007016 | 4/1993 |
| WO | WO 2003/073123 | 9/2003 |
| WO | WO 2009/151781 | 12/2009 |
| WO | WO 2011/098848 | 8/2011 |
| WO | WO 2011/154681 | 12/2011 |
| WO | WO 2012/172526 | 12/2012 |
| WO | WO 2013/087527 | 6/2013 |
| WO | WO 2014/021961 | 2/2014 |
| WO | WO 2014/129944 | 8/2014 |
| WO | WO 2015/026471 | 2/2015 |
| WO | WO 2015/099679 | 7/2015 |
| WO | WO 2015/134152 | 9/2015 |
| WO | WO 2015/155133 | 10/2015 |
| WO | WO 2015/197826 | 12/2015 |
| WO | WO 2017/079219 | 5/2017 |
| WO | WO 2017/079222 | 5/2017 |
| WO | WO 2017/079228 | 5/2017 |
| WO | WO 2017/079229 | 5/2017 |
| WO | WO 2017/079289 | 5/2017 |
| WO | WO 2017/079290 | 5/2017 |
| WO | WO 2017/079301 | 5/2017 |
| WO | WO 2017/079304 | 5/2017 |
| WO | WO 2017/079311 | 5/2017 |
| WO | WO 2017/079321 | 5/2017 |
| WO | WO 2017/079332 | 5/2017 |
| WO | WO 2017/079341 | 5/2017 |
| WO | WO 2017/079349 | 5/2017 |

(56) References Cited

FOREIGN PATENT DOCUMENTS

| WO | WO 2017/079460 | 5/2017 |
|---|---|---|
| WO | WO 2017/079474 | 5/2017 |

OTHER PUBLICATIONS

"Mobility Solution", Easymile.com, retrieved from https://web.archive.org/web/20150801205410/http://easymile.com/mobility-solution/, Aug. 2015, 6 pages.
"Methods for determining the mileage of vehicles," GPS Logger, 2012, retrieved from http://www.gpslogger.ru/odometer/, retrieved on Jul. 21, 2017, 8 pages, English translation.
"Programmer's Guide", ChartePoint, Inc., ChargePoint Web Services API Version 4.1, Document Part No. 75-001102-01, Revision 4, May 16, 2014, Retrieved on the Internet at <https://na.chargepoint.com/UI/downloads/en/ChargePoint_Web_Services_API_Guide_Ver4.1_Rev4.pdf>, 112 pages.
"Why GaN circuits make better Lidar," Efficient Power Conversion, retrieved on Jul. 18, 2017 at http://epc-co.com/epc/DesignSupport/TrainingVideos/eGaNDemos/GaN-circuits-make-better-LiDAR.aspx, 2 pages.
Abramov et al., "Real-time image segmentation on a GPU," Facing the Multi-Core Challenge (Book), pp. 131-142, Berlin, Germany, 2010, 12 pages.
Agha-Mohammadi et al., "Dynamic Real-time Replanning in Belief Space: An Experimental Study on Physical Mobile Robots," Technical Report TR 13-007; Texas A&M University, USA, 2013, 26 pages.
Bayazit et al., "Swarming Behavior Using Probabilistic Roadmap Techniques," Swarm Robotics SR 2004, Lecture Notes in Computer Science, vol. 3342, Springer-Verlag Berlin Heidelberg, pp. 112-125, 15 pages.
Bodensteiner et al., "Monocular Camera Trajectory Optimization Using LiDAR Data," IEEE International Conference on Computer Vision Workshops, Nov. 6-13, 2011, Barcelona, Spain, 9 pages.
Eckes et al., "Combining Data-Driven and Model-Based Cues for Segmentation of Video Sequences," INNS Press & Lawrence Erlbaum Associates, Proceedings WCNN '96, San Diego, USA, Sep. 16-18, 1996, pp. 868-875, 8 pages.
Grisetti et al., "A Tutorial on Graph-Based SLAM," IEEE Intelligent Transportation Systems Magazine, 2010, vol. 2(4), pp. 31-43, 11 pages.
Held et al., "A Probabilistic Framework for Object Detection in Images Using Context and Scale," International Conference on Robotics and Automation, 2012, 7 pages.
Held et al., "Combining Shape, Color, and Motion for Robust Anytime Tracking," Robotics: Science and Systems, Berkeley, California, 2014, 11 pages.
Held et al., "Precision Tracking with Sparse 3D and Dense Color 2D Data," International Conference on Robotics and Automation, 2013, 8 pages.
Hol, "Sensor Fusion and Calibration of Inertial Sensors, Vision, Ultra-Wideband and GPS," Linkoping Studies in Science and Technology, Dissertations No. 1368; Department of Electrical Engineering; Linkoping University, SE-581 83 Linkoping, Sweden (2011), 165 pages.
Kong et al., "Evaluation of Urban Vehicle Routing Algorithms," International Journal of Digital Content Technology and its Applications, 2012, vol. 6(23), pp. 790-799.
Lee et al., "Exponential Family Sparse Coding with Applications to Self-taught Learning," Proceedings of the 21st International Joint Conference on Artificial Intelligence, 2009, 8 pages.
Levinson et al., "Automatic Online Calibration of Cameras and Lasers," Robotics: Science and Systems, 2013, 10 pages.
Levinson et al., "Map-Based Precision Vehicle Localization in Urban Environments," Robotics: Science and Systems, 2007, 9 pages.
Levinson et al., "Robust Vehicle Localization in Urban Environments Using Probabilistic Maps," International Conference on Robotics and Automation, 2010, 8 pages.
Levinson et al., "Towards Fully Autonomous Driving: Systems and Algorithms," IEEE Intelligent Vehicles Symposium (IV), Baden-Baden, Germany Jun. 5-9, 2011, 7 pages.
Levinson et al., "Traffic Light Mapping, Localization, and State Detection for Autonomous Vehicles," International Conference on Robotics and Automation, 2011, 8 pages.
Levinson et al., "Unsupervised Calibration for Multi-Beam Lasers," International Symposium on Experimental Robotics, 2010, 9 pages.
Levinson, "Automatic Laser Calibration, Mapping, and Localization for Autonomous Vehicles," Thesis (Ph D); Stanford University, 2011, 153 pages.
Ma et al., "Large Scale Dense Visual Inertial SLAM," Field and Service Robotics, 2016, pp. 141-155, 14 pages.
Ma et al., "Simultaneous Localization, Mapping, and Manipulation for Unsupervised Object Discovery," IEEE International Conference on Robotics and Automation, 2014, 8 pages.
Mertz et al., "Collision Warning and Sensor Data Processing in Urban Areas," The Robotics Institute, Carnegie Mellon University, School of Computer Science, Research Showcase @ CMU, Jun. 2005, 8 pages.
Morton et al., "An evaluation of dynamic object tracking with 3D LIDAR," Proceedings of Australasian Conference on Robotics and Automation, Dec. 7-9, 2011, Melbourne, Australia, 10 pages.
Keivan et al., "Online SLAM with Any-Time Self-Calibration and Automatic Change Detection," IEEE International Conference on Robotics and Automation, 2014, 8 pages.
Rim et al., "The Optical Advantages of Curved Focal Plane Arrays," Optics Express, 2008, vol. 16(7), pp. 4965-4971.
Teichman et al., "Group Induction," Proc. of the IEEE/RSJ International Conference on Intelligent Robots and Systems, 2013, 8 pages.
Teichman et al., "Online, Semi-Supervised Learning for Long-Term Interaction with Object Recognition Systems," RSS Workshop on Long-Term Operation of Autonomous Robotic Systems in Changing Environments, Department of Computer Science, Stanford University, 2012, 62 pages.
Teichman et al., "Practical Object Recognition in Autonomous Driving and Beyond," IEEE Workshop on Advanced Robotics and its Social Impacts, 2011, 5 pages.
Teichman et al., "Towards 3D Object Recognition via Classification of Arbitrary Object Tracks," International Conference on Robotics and Automation, 2011, 9 pages.
Teichman et al., "Tracking-Based Semi-Supervised Learning," Robotics: Science and Systems, 2011, 9 pages.
Thrun, "Toward Robotic Cars," Communications of the ACM, 2010, vol. 53(4), 8 pages.
Trifonov, "Real-Time High Resolution Fusion of Depth Maps on GPU," International Conference on Computer-Aided Design and Computer Graphics, 2013, pp. 99-106.
Xu et al., "A Real-Time Motion Planner with Trajectory Optimization for Autonomous Vehicles," IEEE International Conference on Robotics and Automation, May 14-18, 2012, RicerCentre, St. Paul, MN, USA, 2012, 7 pages.
Xu et al., "A calibration method of the multi-channel imaging lidar," Proc. SPIE 9080, Laser Radar Technology and Applications XIX; and Atmospheric Propagation XI, 90800V (Jun. 9, 2014); doi:10.1117/12.2049678, 2 pages.
Zhang et al., "Control of robotic mobility-on-demand systems: A queueing-theoretical perspective," International Journal of Robotics Research, 2015, pp. 1-18.
Official Action for U.S. Appl. No. 15/393,028, dated Jun. 28, 2017 15 pages.
Notice of Allowance for U.S. Appl. No. 15/393,028 dated Jan. 3, 2018 24 pages.
International Search Report and Written Opinion for International (PCT) Patent Application No. PCT/US2019/013849, dated Apr. 24, 2019 11 pages.

* cited by examiner

EVENT DATA RECORDATION TO IDENTIFY AND RESOLVE ANOMALIES ASSOCIATED WITH CONTROL OF DRIVERLESS VEHICLES

FIELD

Various embodiments relate generally to autonomous vehicles and associated mechanical, electrical and electronic hardware, computing software, including autonomy applications, image processing applications, etc., computing systems, and wired and wireless network communications to facilitate autonomous control of vehicles, and, more specifically, to systems, devices, and methods configured to record event data to identify and resolve anomalies associated with control of driverless vehicles.

BACKGROUND

On-board vehicular processes (e.g., algorithms, software, logic) in traditional cars and conventional autonomous vehicles are typically designed to localize vehicle position relative to perceived objects in a given environment. Various types of on-board processes are designed to try to generate and apply trajectories to control the routing of an autonomous vehicle, but may be overridden when a human driver assumes control in some conditions, circumstances, or environments.

Conventional approaches to determine deficiencies of the on-board vehicular processes, responsive to human driver intervention, typically rely on implementing test vehicles or other agency vehicles (e.g., fleets, including rental vehicle fleets) over which control is maintain by a vehicle manufacturer. While functional, conventional techniques to ensure reliable autonomous logic operation suffer a number of drawbacks.

As one example, known techniques for detecting and correcting deficiencies in autonomous operation of a fleet of test are generally limited to a minimal set of actions that are usually downloaded upon return to a central location at which data may be analyzed. Typically, results of tracking and analyzing data collected by on-board vehicular processes are stored locally on a vehicle and, in some cases, are discretely distributed via manual removal of a storage medium to transfer data to a centralized location for deeper analysis and for comparisons with other vehicle data. Conventionally, manual manipulation of locally-gathered operational data is performed to identify areas of improvement, diagnostic situations, and is time, labor, and resource-intensive. Thus, conventional solutions are not well-suited to correlate locally-gathered vehicle data programmatically with pools of data to detect trends or optimal vehicle responses based on, for example, human-related inputs that override control of vehicle logic.

Thus, what is needed is a solution for implementing autonomous control functions to resolve anomalies associated with control of driverless vehicles, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
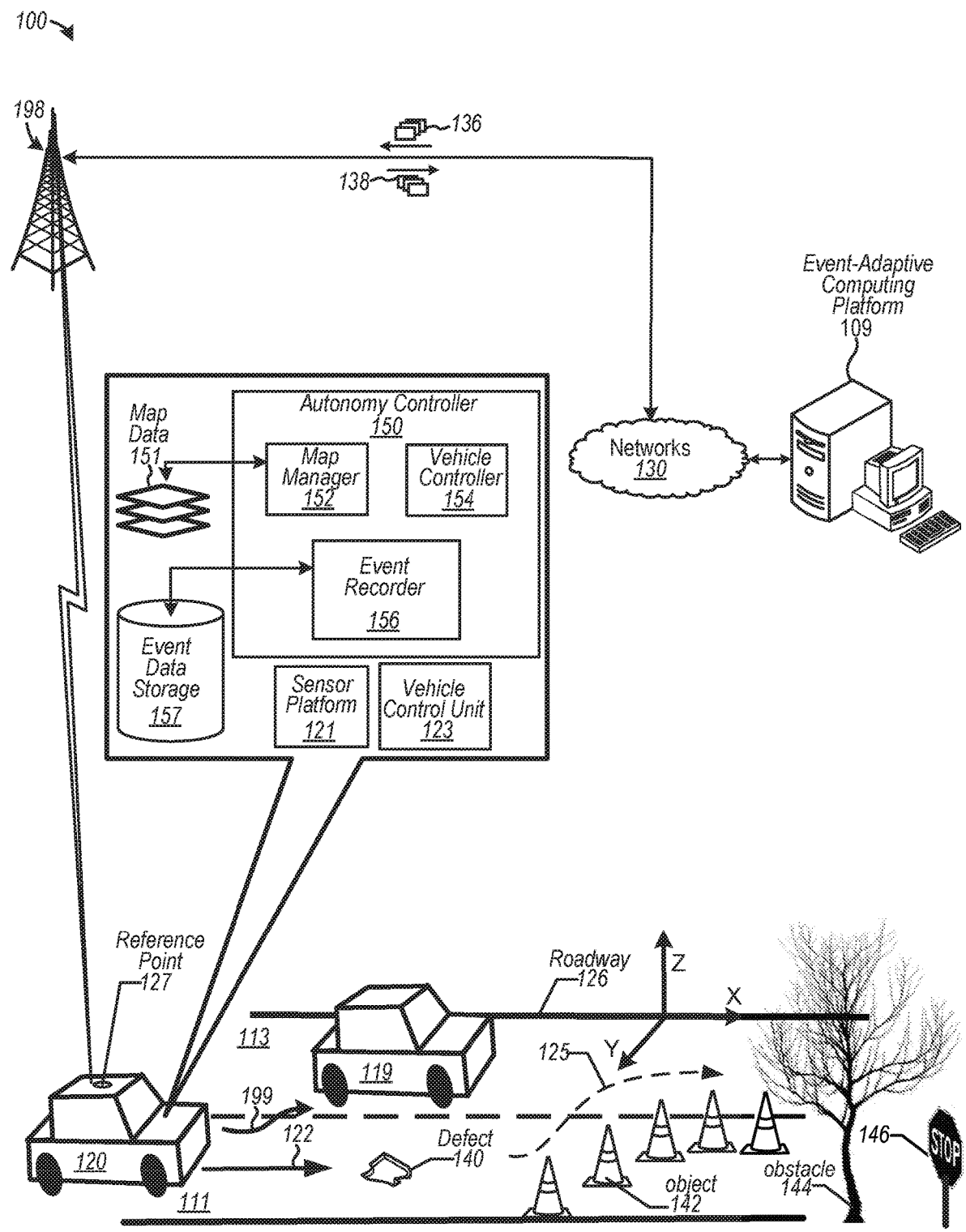
FIG. 1 is a diagram depicting an example of an autonomy controller including an event recorder, according to some embodiments.

FIG. 1 is a diagram depicting an example of an autonomy controller including an event recorder, according to some embodiments. Diagram 100 depicts an example of autonomy controller 150 configured to determine trajectories for an autonomous vehicle 120 to facilitate driverless, collision-free navigation via a path of travel based on computed trajectories 122. Autonomy controller 150 may include an event recorder 156 that may be configured to receive data from multiple sources whether internal or external to autonomous vehicle 120, and further configured to identify an interval of time in which to store a subset of received data (e.g., event data) associated with an event in, for example, an event storage repository 157. An event may be identified as a subset of observed values of data that deviate from a range of expected values (e.g., associated with expected behavior of a user or autonomy controller 150) for a specific condition (e.g., autonomous vehicle 120 may be descending a curved roadway during a time at which freezing rain may affect a surface of a roadway, whereby a human user and autonomy controller 150 may differ how to navigate the environmental conditions). An analysis of an event, based on recorded or captured data, may assist in improving actions performed by autonomous vehicle 120 or by interactions between a user and autonomous vehicle 120 via, for example, updates to on-board logic and associated processing.

An example of captured data from the multiple sources includes control data originating at a user control device, such as a steering mechanism, a throttle, a braking device, and a transmission shifting control, among others. Hence, control data may include steering data, throttle data, braking data transmission shifting data, etc. Another example of captured data from the multiple sources includes computed vehicular drive parameters, such as a degree of wheel angle, an amount of throttle, an amount of brake pressure, a state of transmission, and other computed values of which may be applied to facilitate driverless transit. Thus, examples of applied (e.g., controlled by human driver) vehicular drive parameters or computed (e.g., controlled by autonomy controller 150) vehicular drive parameters include parameter data representing steering data (e.g., degree(s) of wheel angle to effect a turn), acceleration data (e.g., an amount of throttle or power to apply to a drive train or the like), deceleration data (e.g., an amount of pressure to apply to brakes to reduce velocity), transmission data (e.g., a state of a transmission subsystem to effect forward motion and reverse motion in one or more states of speed and torque), and the like.

Yet another example of captured data from multiple sources include derived data (e.g., metadata) calculated as a result of computations or processing other data to determine various states, responses, etc. to facilitate driverless operation, such as a list of determined objects in an environment (e.g., lamp posts, trees, bicycles, cars, signs, pedestrians, cyclists, dogs, fire hydrants, etc.), and a state of an "ESP" flag indicating whether an electronic stability program ("ESP") is activated to provide stability or traction control (e.g., responsive to skidding on ice). In some implementations, derived data may include computed vehicular drive parameters, may represent a course of action based on one or more rules (e.g., maintaining a lane offset due to detection of cones demarcating a construction zone) or may include results of on-board vehicle diagnostics processing. Other examples of captured data from the multiple sources may include sensor data (e.g., lidar data, radar data, image data, GPS data, wheel or odometry data, accelerometer data, ambient or external air temperature, grade or angle of a roadway surface, etc.).

An "event" may refer to, at least in some examples, to one or more conditions (e.g., based on event data) that may cause anomalous or potentially anomalous operation of autonomous vehicle 120 (or a portion thereof). Anomalous operation may be due to a behavior anomaly, a vehicle anomaly, an environmental anomaly, and the like. Examples of a behavior anomaly may include user-specific driving-related behavior, such as user-specific rates of acceleration and turning, ranges of speed, rates of deceleration (e.g., amounts of braking pressure), driving patterns, and the like. Behavior anomaly may also include a human user interaction with autonomy controller 150 or the control devices of autonomous vehicle 120, or both. For example, human engagement or disengagement control devices with which to provide control signals for driving autonomous vehicle 120 may be an event. To illustrate, consider a human driver is providing control signals (e.g., applied vehicular drive parameters) with which to navigate and propel an autonomous vehicle 120 over a path of travel. Contemporaneously, autonomy controller 150 may be configured to actively compute vehicular drive parameters and other data with which to apply to subsystems, components, and subcomponents of autonomous vehicle 120. However, the computed vehicular drive parameters may be used as a reference and need not be applied. In this case, a deviation of applied vehicular drive parameter values from computed vehicular drive parameter values by a range of expected values may be deemed an event. For example, an event may exist when the user turns a steering wheel to cause wheels to turn by "X" degrees to the left and user accelerates at a rate "A" with application of throttle by "T" amount, whereas autonomy controller 150 may generate computed vehicular parameter values to turn the wheels right (i.e., in an opposite direction) by "Y" degrees (i.e., in a different amount) and apply brakes (i.e., opposite of accelerating) with a pressure "P" (i.e., in a different type and amount relative to application of throttle amount "T"). Thus, event recorder 156 may be configured to capture steering wheel data, acceleration data, braking data, and the like for analysis to reconcile or resolve whether a user and/or autonomy controller 150 operated non-normatively, and, if so, whether a valid reason or goal was obtained (e.g., assuring safety as a goal). Autonomy controller 150 may be configured to detect deviations or violations of one or more rules, such as maintaining three feet of distance from a cyclist, whereby a deviation from a rule may be an event.

Examples of a vehicle anomaly include malfunctioning or suboptimal operation of one or more electrical, mechanical, electrical-mechanical, optical, etc. components of autonomous vehicle 120, such as a non-normative sensor (e.g., suboptimal lidar sensor), computational deficiencies (e.g., due to hardware, software or firmware), mechanical actuators (e.g., to cause wheels to turn or application of brake pads), and the like. Event recorder 156 may be configured to capture data or information associated with a malfunctioning or suboptimal component or subsystem for analysis and resolution.

Examples of an environmental anomaly may include static objects that may lie upon one or more trajectories or a path of travel, or static objects (e.g., sloped roadway) that may affect one or more performance characteristics of autonomous vehicle 120 (e.g., increased resistance due to traveling uphill, or decreased friction or traction due to the ice or slippery roadway surfaces). Static objects may also include roadway defects, such as potholes, that may be detected (or may yet to be detected) when autonomy controller 150 identifies a roadway surface having a non-planar surface portion. Static environmental anomalies may also include road topologies that differ from map data 151 (e.g., from HD map data), such as construction zones, new road markings, new signage (e.g., a new stop sign), and the like. Examples of environmental anomalies that may include dynamic objects other vehicles that do not operate in accordance with normative traffic regulations, rules, patterns, etiquette, and behaviors. Also, dynamic environmental anomalies may also include any road user, such as a cyclist, that moves in an unpredictable or unexpected manner. Event recorder 156 may be configured to capture data or information associated with static and dynamic environmental anomalies for analysis and resolution. The above-described examples of vehicle, behavior, and environmental anomalies are illustrative and are not intended to be limiting. As such, autonomy controller 150 and event recorder 156 may be configured to detect and record any anomaly associated with any one or more data signals associated with vehicular drive parameters, sensor data, environmental data, and the like.

In view of the foregoing, the structures and/or functionalities depicted in FIG. 1 illustrate an autonomy controller 150 configured to capture data relevant to events and initiate actions to resolve functional discrepancies and enhance reliability of autonomous logic (e.g., hardware or software, or a combination thereof) implemented in autonomy controller 150, thereby facilitating driverless navigation and propulsion reliably, according to some embodiments. Thus, autonomy controller 150 and/or event recorder 156 in autonomous vehicle 120 may be configured to monitor various streams of data regarding the performance and control of autonomous vehicle 120 from a variety of sources to detect an event. Event recorder 156, responsive to detecting an event, may be configured to record one or more streams of data proceeding, during, and subsequent to detection of the event. Autonomy controller 150 may be configured to analyze event data and initiate one or more actions (e.g., corrective actions). Also, autonomy controller 150 may be configured to transmit event data 138 via communications tower 198 and networks 130 to event-adaptive computing platform 109 to analyze event data in view of other data from other autonomous vehicles 119, and to initiate one or more actions (e.g., corrective actions), such as generating updated logic or software. Event-adaptive computing platform 109 may include centralized or distributed hardware and/or software configured to analyze numerous events associated with numerous autonomous vehicles 120 to identify patterns, deficiencies (whether functional or structural), or any other areas of improving navigation and propulsion of autonomous vehicle 120 in a safe, reliable manner.

According to various examples, event recorder 156 may be implemented as on-board logic, algorithms, and processes configured to collect streams of data to track and analyze data coinciding at or substantially coextensive with events of interest (i.e., exceptional conditions, circumstances, or environments in which sensors, sensory platforms 121, and logic may detect exceptions that can be recorded for analysis). Upon such an analysis, logic or software of autonomy controller 150 may be updated to generate enhanced or refined rules of operation (e.g., updated autonomy controller logic). Updates to logic or software of autonomy controller 150 may be transmitted as data 136 from event-adaptive computing platform 109 to autonomy controller 150 of autonomous vehicle 120.

Exceptions may be caused by an action of a user, autonomy controller 150, or an environmental event, or the like. An event of interest may be an instance during which human input (i.e., manual intervention) overrides autonomy controller 150 or autonomous operation to deviate (e.g., by a threshold range of expected values or actions) from one or more trajectories or courses of action computed by autonomy controller 150. For example, an event may be an instant in which a human driver overrides a "rule," such as running a red light or crossing a double yellow line during periods of high traffic to evade collision with another vehicle 119 or a pedestrian (e.g., if the operation can be safely performed without impacting vehicle 119).

Event recorder 156 may be configured to "data mine," thereby collecting data and information from a variety of sensors in sensor platform 121, as well as derived data generated by logic, algorithms, or processes of autonomy controller 150, such as localization data, perception data (e.g., object recognition and classification data), trajectory data, and physical vehicle data (e.g., steering angles, braking pressures, etc.). In some examples, pattern data stored in event storage 157 may be used by event recorder 156 to determine whether a subset of data matches a pattern of event data stored in the event storage 157. The pattern of event data may be associated with an event, which may be used to identify non-normative operation ("an event") and evaluate, for example, a human decision relative to autonomous vehicle logic. Data associated with non-normative operation may be transmitted as data 136 in view of particular transmission criteria to event-adaptive computing platform 109 for further analysis, whereas data associated with normal operation may be purged, at least in some cases, to preserve bandwidth and reduce non-beneficial computations or data transfers. Among other things, event recorder 156 may be configured to preserve data that otherwise might be unrecorded or discarded rather than to generate improvements to autonomy logic.

According to some examples, event recorder 156 may "learn" characteristics, such as vehicular drive parameter values, associated with traversing a path of travel during which an anomaly may be detected as an event. In some examples, event recorder 156 and event-adaptive computing platform 109, in combination, may "learn" which subset of characteristics may be modified to improve, for example, reliable autonomous vehicle operation. To illustrate, consider the following examples in which event recorder 156 may monitor various data signals from which to identify an event.

In one example, consider that autonomous vehicle 120 is under control of a human driver that is controlling vehicle to transit lane 111 of roadway 126 based on one or more trajectories 122, as determined by control signals originating from control devices (e.g., steering wheel, a throttle pedal, a brake pedal, a transmission shifter, etc.) that accept human input. While a human driver may be exerting control over autonomous vehicle 120, autonomy controller 150 may be configured to contemporaneously perform computations as if autonomous vehicle 120 is under control of autonomy controller 150. However, signals generated by autonomy controller 150 may be prohibited from being applied to various systems or subsystems of autonomous vehicle 120, thereby enabling the human driver to exert dominion over navigation and propulsion while generating baseline data with which to compare to behavior of a human driver.

Continuing with the above example, consider that a human driver of autonomous vehicle 120 identifies a pothole as defect 140 and roadway 126. The human driver of autonomous vehicle 120 may try to modify a path of travel to a new path of travel 199 into lane 113 to avoid defect 140, but as autonomous vehicle 120 crosses a lane marking the driver returns autonomous vehicle 120 to lane 111. Further, consider autonomy controller 150 may detect via a sensor platform 121 that a vehicle 119 in lane 113 obstructs the new path of travel 199, but autonomy controller 150 does not detect non-planar defect 140. Therefore, autonomy controller 150 may generate computed vehicular drive parameters that would otherwise cause autonomous vehicle 122 travel straight along lane 111, whereas event recorder 156 may detect that applied vehicular drive parameters (i.e., human input), such as a steering wheel angle, is being applied to alter course into lane 113. In this case, event recorder 156 may identify the conflicting courses of action as an event, and begin recording one or more subsets of data as event data. Next, consider that an accelerometer sensor (not shown) of autonomous vehicle 120 detects a sharp fluctuation and is the Z-direction, which may be associated with a suspension system of autonomous vehicle 120 traveling into and out of a pothole 140. Data associated with the "pothole" event (e.g., event recorder 156 detects countermanding user input and an abrupt Z-axis translation that indicates having a whole in roadway 126) then may be transmitted as data 138 to event-adaptive computing platform 109. In response, event-adaptive computing platform 109 may evaluate a subset of signals representing event data, including comparing the subset of signals against one or more patterns of similar event data (e.g., from other autonomous vehicles 120) to identify modifications to autonomy controller 150 or other autonomous-related data to resolve, minimize, or negate similar conflicting vehicular drive parameters (e.g., applied versus computed) relative to defect 140. For example, event-adaptive computing platform 109 may transmit updated map data 136 to be used for other autonomous vehicles 120, where map data 136 identifies pothole 140 based on above-described Z-axis acceleration data. The updated map data may be used to avoid pothole 140 during subsequent travels over lane 111. Further, event-adaptive computing platform 109 may generate an updated revision of image capture processes as well as other sensor software to increase the likelihood of identifying and detecting defect 140. Such a revision transmitted as update data 136 for implementation by autonomy controller 150. Event-adaptive computing platform 109 may be configured to modify any portion of logic for implementing autonomy controller 150, or the like, of autonomous vehicle 120 to determine an optimal subset of actions or rules autonomy controller 150 may implement similar subsequent situations relating to, for example, pothole 140.

In another example, consider that autonomous vehicle 120 is under control of autonomy controller 150 as autonomous vehicle 120 is driving via lane 111 prior to reaching a construction zone demarcated by objects 142, which are traffic cones. In this case, traffic cones 142 may not be stored as part of map data 151 (i.e., not part of an HD map) and may be detected precedentially via sensor platform 121 by autonomy controller 150. As detection of traffic cones 142 may be precedential, event recorder 156 may identify the detected cones 142 as an event. Regardless, autonomy controller 150 may be configured to maintain a lane offset along path 125 relative to cones 142 to navigate into lane 113 without collision around objects 142. In some situations, a human driver may intervene to assume control should the user perceive path 125, for example, being implement too close to the construction zone. As such, the user may "yank" control from autonomy controller 150. Event recorder 156 may record multiple subsets of data associated with the event for transmission as data 138 to event-adaptive computing platform 109, which may be configured to, for example, identify objects 142 as an environmental anomaly and to further characterize the driving behaviors of the human driver to classify the driver as a type of driver with which to modify subsequent encounters with objects 142. Thus, path 125 around cones 142 may be initiated sooner (e.g., farther away from the construction zone) so as to provide comfort to the classified user so that they need not feel compelled to assume manual control of autonomous vehicle 120.

In yet another example, consider that autonomous vehicle 120 is under control of autonomy controller 150 as autonomous vehicle 120 is driving via lane 111 prior to reaching a stop sign 146, the view of which may be obstructed by a tree 144 as an obstacle. Next, consider that stop sign 146 has been recently implemented, and, thus may not be included in map data 151 (e.g., anomalous controller 150 may not identify a geographic location at which stop sign 146 may be implemented). A camera or image capture device of sensor platform 121 may not identify subset 146 until autonomous vehicle 120 travels beyond tree 144, which then may require an immediate stop at which a human driver may intervene and apply significant braking pressure to avoid driving through stop sign 146. Sudden deceleration and/or application significant braking pressure (e.g., slamming the brakes) to cause an immediate stop may be identified as an event. In some examples, event recorder 156 may record data, such as event data, prior to detecting occluded stop sign 146, as well as during the application of a range of braking pressures that exceed expected values of braking pressures. Also, event recorder 156 may record event data after stopping at or adjacent stop sign 146 (i.e., post-event recordation of event data). Event recorder 156 then may transmit at least a subset of the recorded data 138 to event-adaptive computing platform 109, which may be configured to, for example, generate updated map data 136 for revising map data 151 to include a location of stop sign 146 for subsequent approaches by autonomous vehicles 120 so as to adjust computed vehicular drive parameters to slowly stop at stop sign 146. Note that the above-described examples of event recorder 156 are not intended to be limiting, and thus event recorder 156 may be configured to detect any type of event and record any type or amount of event data, according to various examples.

According to various examples, either autonomy controller 150 or event-adaptive computing platform 109, or both, may transmit or receive event in accordance with one or more transmission criteria. In some examples, one or more transmission criteria may be used to facilitate transfer of event data relatively expeditiously and efficiently. For example, examples of transmission criteria include a cost of transmission, a bandwidth threshold of transmission (e.g., a limited amount of bandwidth per unit time), a type of communication channel over which data transfer occurs (e.g., via WiFi, Ethernet, cellular, etc.). In some cases, event recorder 156 may transmit event data during a time interval, which may include a proceeding interval of time prior to the event and/or any a subsequent interval of time after the event. According to numerous examples, event-adaptive computing platform 109 configured to analyze pre-event data and post-event data to, for example, predict or identify an event, and to determine an action responsive to the event, including corrective actions.

Autonomous vehicle 120 is shown to include a sensor platform 121, a vehicle control unit 123, and an autonomy controller 150, one or more of which may include logic configured to detect a vehicular drive parameter to form a programmed path of travel, navigate autonomous vehicle 120 over a path of travel 122. Sensor platform 121 may include any number of sensors (not shown) with which to facilitate driverless control of autonomous vehicle 120. Examples of sensors include one or more image capture devices (e.g., image sensors or cameras to capture video including high definition, or "HD," cameras), one or more radar devices (e.g., short-range radar, long-range radar, etc.), one or more LIDAR devices, one or more sonar devices (or sensors configured to detect ultrasound), one or more global positioning system ("GPS") devices, one or more inertial measurement units ("IMU") devices, and one or more other types of sensors including, but not limited to, gyroscopes, accelerometers, odometry sensors, steering wheel angle sensors, tire angle sensors, throttle sensors, brake pressure sensors, proximity sensors (e.g., in or adjacent to a seat to determine whether occupied by a passenger), etc. An example of an image capture device may include high definition ("HD") cameras (or CMOS/CCD sensors) that may have image resolutions greater than 640×480, such as 1280×720, 1920×1080, 2560×1600, or greater. Further, one or more cameras may operate to capture imagery at any range or spectral band of light. For example, a camera may be configured to capture images in the visible light or infrared light spectra. At least a subset of the aforementioned sensors of sensor platform 121 may be used to localize autonomous vehicle 120 at reference point 127 relative to its environment and objects within the environment (e.g., relative to roadway markings, a lamp post, a tree, and the like), and relative to a position in a global coordinate system (e.g., using GPS coordinates). Further, one or more sensors of sensor platform 121 may sense specific states of wheel angles and throttle positions, as well as any other vehicular drive parameter to establish a whether an event is detected, whereby event data may be recorded for subsequent data transfer.

Vehicle control unit 123 may be coupled (e.g., mechanically and/or electrically, optically, etc.) to steering, braking, transmission, and propulsion units, or to any other component, with which to implement physical changes in steering, acceleration (e.g., throttling), deceleration (e.g., braking), transmission shifting (e.g., directional gear shifting). As an example, vehicle control unit 123 may include electronic interfaces with autonomy controller 150, and thus may be configured to receive data representing steering data (e.g., degree of wheel angle to effect a turn), acceleration data (e.g., an amount of throttle or power to apply to a drive train or the like), deceleration data (e.g., an amount of pressure to apply to brakes to reduce velocity), transmission data (e.g., representing a selected gear and/or a direction), and the like. Vehicle control unit 123 may be further configured to apply control signals to electromechanical systems of autonomous vehicle 120, responsive to the above-described data, including updated data 138 and data associated with an event. In some examples, vehicle control unit 123 may apply changes to at least steering, acceleration and deceleration at a rate of thirty (30) times a second or greater. In some examples, vehicle control unit 123 may receive updates of above-described data (e.g., vehicular drive parameters) to facilitate course corrections or modifications, if any, to ensure autonomous vehicle 120 traverses over path of travel based on one or more trajectories 122.

Diagram 100 also depicts autonomy controller 150 including a map manager 152, a vehicle controller 154, and an event controller 156. Autonomy controller 150 may include logic configured to generate and implement one or more paths of travel, such as paths of travel 122 and 125, which are examples. The logic in autonomy controller 150 may include either hardware or software, or a combination thereof, and may be configured to perform any number of localization and event-determining processes to identify a condition or state of autonomous vehicle 120 with which to activate event recorder 156 to identify and store data associated with an event.

Vehicle controller 154 may include logic configured to control any number of vehicle functions under either human or autonomous control. For example, vehicle controller 154 may determine a pose (e.g., a position and/or orientation) localized at a reference point 127 of autonomous vehicle 120. Reference point 127 may be identified relative to external objects and surfaces of an external environment (or scene), and may be correlated to a position on a roadway 126, which may be described in map data 151. Reference point 127 may be expressed in longitudinal and latitudinal coordinates for identifying a geographic location. Further, vehicle controller 154 may be configured to determine a position of reference point 127 relative to monuments or markers that may be used as known locations or points in a coordinate system to confirm or facilitate localization of autonomous vehicle 120 relative to, for example, roadway 126. Examples of monuments or markers include lane markings, tree 144, or any other object.

Further, vehicle controller 154 may be configured to implement object characterization and classification to identify types and attributes of objects (e.g., whether an object is dynamic or static, whether an object is animate, or living, rather than an inanimate object, etc.), according to some embodiments. Examples of external classified objects include lamp posts, trees, tool benches, bicycles, cars, signs, pedestrians, cyclists, dogs, fire hydrants, etc., and examples of classified external surfaces include pavement of roadway 126, surfaces or contours of adjacent buildings, such as a garage 102, or adjacent structures, such as a communication tower 198, and the like.

Vehicle controller 154 also may be configured to generate trajectories or paths of travel 122 in accordance with a planned route to guide the transiting of autonomous vehicle 120 via lanes 111 and 113 of roadway 126. For a trajectory or path of travel 122, vehicle controller 154 may determine in real-time (or substantially in real-time) a number of path segments constituting a path of travel along roadway 126. To transit along a segment, vehicle controller 154 may compute a number of vehicular drive parameters (i.e., computed vehicular drive parameters) that may be applied incrementally to mechanical drive components (e.g., at a rate of 30 sets of vehicular drive parameters for every second) to cause autonomous vehicle 120 to automatically drive along trajectory-based path segments over roadway 126. Hence, vehicle controller 154 may be configured to compute one or more drive parameters in real-time (or substantially in real-time) with which to apply to vehicle control unit 123, including driving control signals to effect propulsion, steering, braking, transmission shifting, lighting (e.g., emergency flashers), sound (e.g., automatic horn alerts, etc.), among other functions.

Further, vehicle controller 154 may be configured to calculate a variety of trajectories per unit time (e.g., per second), in real-time or substantially in real-time, that may be used to guide autonomous vehicle along a route from a point of origination to a point of destination, most of which may be calculated to facilitate driverless control. For example, vehicle controller 154 may select and implement a trajectory relative to locations of external dynamic and static objects along a sequence of roadways that provides for collision-free travel over the roadways, such as roadway 126. Thus, autonomy controller 150 may also be configured to compute vehicular drive parameters based on the calculated trajectories to facilitate transit of autonomous vehicle 120 to a destination geographical location.

Map manager 152 may be configured to implement map data 151 to localize and navigate autonomous vehicle 120 relative to roadway 126 or any pathway or route, any of which may be represented as image data. Map data 151 may include relatively high resolutions of images of roadway 126 and adjacent objects, such as communication tower 198 and the like. In some examples, map data 151 may include static or semi-static objects that have a relatively low or negligible probability of moving positions. Thus, static objects may be used as monuments or markers in accordance with some implementations. Autonomy controller 150 may use map data 151 to identify external imagery to facilitate route planning (e.g., planning paths of travel relative to roadway 126 as depicted in map data 151). Map data 151 may include image data representing lane markings as well as data representing lane widths and curbs (e.g., with curb markings, such as "loading zone," etc.). In some examples, map data 151 may include image data having image resolutions greater than 640×480, such as high definition resolutions of 1280×720, 1920×1080, 2560×1600, or greater. Further, one or more cameras may operate to capture imagery at any range of wavelengths or any spectral bands of light, regardless of an HD resolution. For example, a camera may be configured to capture images in the visible light or infrared light spectra. Thus, map data 151 may include images depicted in the visible light spectra, the infrared light spectra, or the like. Map data 151 may also include any type of map data, such as 2D map data, 3D map data, 4D map data (e.g., includes three-dimensional map data at a particular point in time), or the like. Additionally, map data 151 may include route data, such as road network data, including, but not limited to, route network definition file ("RNDF") data (or similar data) and the like.

Map manager 152 may also be configured to generate a dynamic representation of map data 151 by fusing or combining static map data (e.g., image data representing visual characteristics of roadway 126 and static objects, such as road markings, tree 144, stop sign 146, etc.) and dynamic map data to form dynamic map data 151. In some examples, dynamic map data may include data representing objects detected via image capture (and/or other sensor data, including lidar), whereby an object may have attributes indicative of dynamism, such as a pedestrian or a cyclist. In at least one case, dynamic map data may include temporally-static objects (e.g., semi-static objects), which may be temporally static for a certain duration of time (e.g., during construction or times of day) and may be added or removed dynamically from a mapped environment.

In some examples, map data 151 may include images in high resolutions that include granular details of an environment or scene in which an autonomous vehicle is driving to ensure relatively accurate and precise localization, object classification, navigation, path of travel generation (e.g., trajectory generation), etc., as well as ensuring accurate and precise customized orientation and positioning when self-parking a vehicle. According to some implementations, portions of map data 151 associated with a planned route along various paths of travel may be downloaded (e.g., as adjacent blocks of grid-type HD map data) as an autonomous vehicle travels along the route, thereby preserving resources (e.g., relatively large amount of storage need not be required to store an entire HD map of a particular region, such as a country). Note that a "driverless" autonomous vehicle may refer to, at least in one example, to a vehicle that may be configured to be either manually-driven (e.g., human operator provides control signal input) or automated (e.g., a computing system, such as an autonomy controller controls propulsion and steering).

Figure 2:
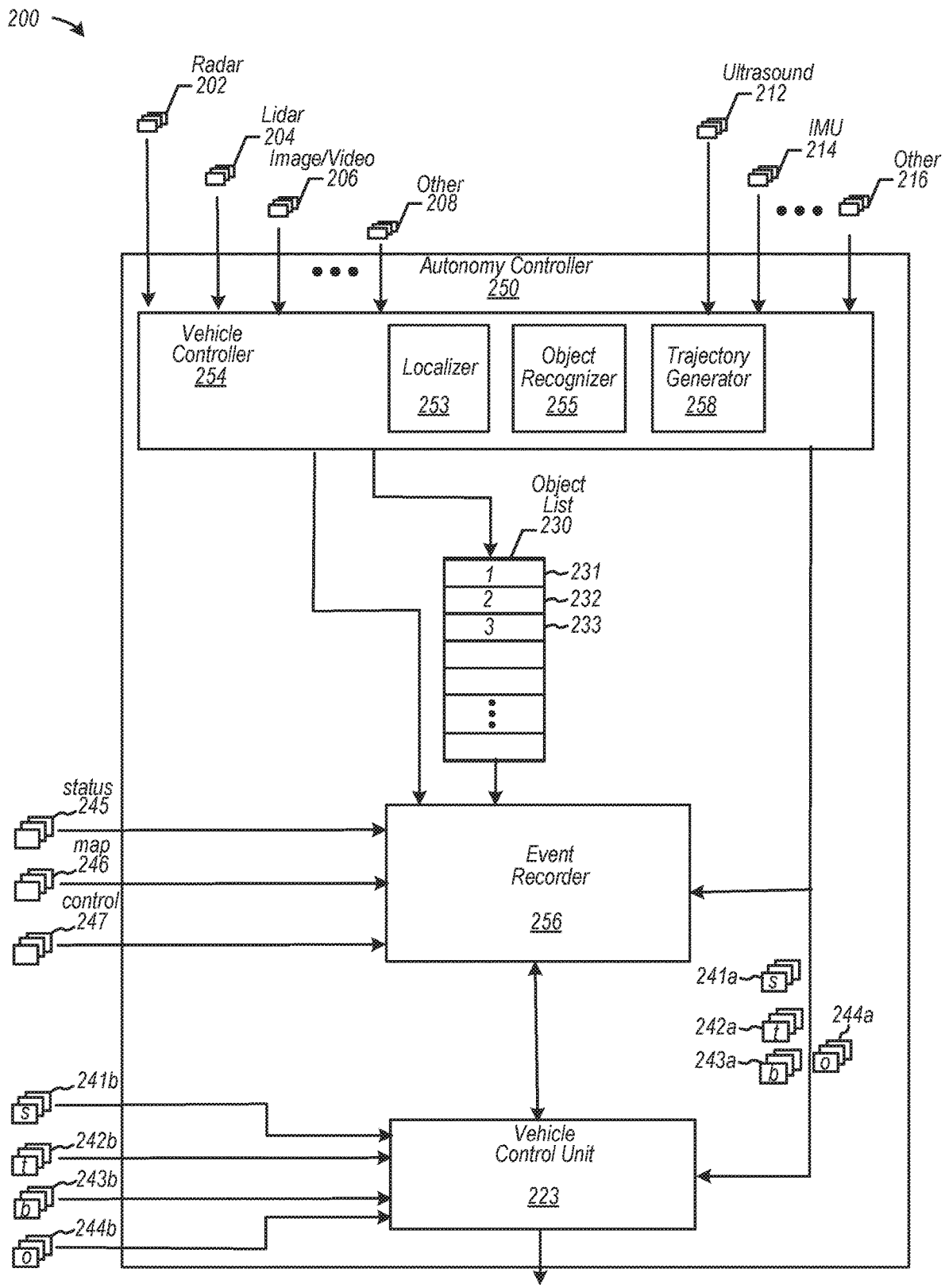
FIG. 2 is a diagram depicting another example of an event recorder, according to some embodiments.

FIG. 2 is a diagram depicting another example of an event recorder, according to some embodiments. Diagram 200 depicts autonomy controller 250 including a vehicle controller 254 configured to generate an object list 230, among other things. Autonomy controller 250 also includes an event recorder 256 and a vehicle control unit 223. As shown, autonomy controller 250 may be configured to receive radar sensor data 202, lidar sensor data 204, image/video data 206, and other sensor data 208, each of which may be received into vehicle controller 254. Also, autonomy controller 250 also may be configured to receive ultrasound sensor data 212, inertial measurement unit ("IMU") data 214, and other sensor data 216 (e.g., GPS data, wheel or odometry data, gyroscopic data, etc.), each of which may be received into vehicle controller 254 or any component of autonomy controller 250.

Vehicle controller 254 may, in some examples, be configured to facilitate localization or any other function performed by components of an autonomous vehicle. For example, localizer 253 can determine a pose (e.g., a local position and orientation) at any one of number of geographic locations. As such, localizer 253 may use acquired sensor data, such as sensor data associated with lamp posts, trees, or surfaces of buildings (e.g., a garage), which can be compared against reference data, such as map data (e.g., 3D map data, including reflectance data) to determine a local pose. According to some examples, localizer 253 may determine a relative geographic location of an autonomous vehicle relative to, for example, a global coordinate system (e.g., latitude and longitudinal coordinates, etc.).

Vehicle controller 254 may be configured to facilitate object identification. For example, object recognizer 255 may be configured to implement object characterization and classification to identify types and attributes of objects (e.g., whether an object is dynamic or static, such as whether an object is animate or inanimate), according to some examples. Examples of classified objects include lamp posts, trees, tool benches, bicycles, cars, signs, pedestrians, cyclists, dogs, fire hydrants, etc., and examples of classified external surfaces include pavement of a roadway, surfaces or contours of adjacent buildings, or adjacent structures, such as a communication tower 198 of FIG. 1, and the like. In the example shown, vehicle controller 254 may detect and classify objects to generate an object list 230, which includes a list of objects, such as object ("1") 231, object ("2") 232, object ("3") 233, etc. The objects may represent detect and/or classified objects detected by one or more sensors. For example, objects 231, 232, and 233 may include static objects, such as a lamp post, and dynamic objects, such as a person walking. According to some examples, objects of object list 230 may be described as being represented by computed data or "metadata" that may be used to identify an event as well as responsive action, such as corrective action (e.g., updated software or logic).

Also, trajectory generator 258 may be configured to generate trajectories or paths of travel in accordance with a planned route to guide the transiting of an autonomous vehicle via a roadway from origination point "A" (not shown) to destination point "B," such as a destination. To determine a trajectory-based path of travel, trajectory generator 258 may determine in real-time (or substantially in real-time) a number of path segments to evaluate a collision-free path of travel along a roadway. Trajectory generator 258 may implement object list 230 to select trajectories that may avoid collisions with objects 221, 232, and 233. To transit along a segment, trajectory generator 258 may compute a number of vehicular drive parameters that may be applied incrementally to mechanical drive components to cause an autonomous vehicle to traverse along path segments over the roadway without driver input. Hence, trajectory generator 258 may be configured to compute one or more vehicular drive parameters in real-time (or substantially in real-time) with which to apply to event recorder 256 or vehicle control unit 123, including driving control signals to effect propulsion, steering, braking, transmission shifting, lighting (e.g., emergency flashers), sound (e.g., automatic horn alerts, etc.), among other functions.

In some examples, autonomy controller 250 may receive status data 245, map data 246, and control data 247. Status data 245 may include state data about one or more components or sub-systems of an autonomous vehicle (e.g., existence of high temperatures in an electrical power plant or in other electronics, a state of power degradation or voltage degradation, etc.). Responsive to state data of the one or more components or sub-systems, event recorder 256 may be configured to modify a path of travel associated with a parking spot to, for example, modify an orientation or position of the vehicle as it travels. Map data 246, which may be optionally applied, may include data representing supplemental map data to assist in navigating, determining an event, and generating updated logic or software. Control data 247, which may be optionally applied, may include data representing supplemental commands originating from, for example, a user interface, such as on a mobile computing device or in the autonomous vehicle (not shown). One or more elements depicted in diagram 200 of FIG. 2 may include structures and/or functions as similarly-named or similarly-numbered elements depicted in other drawings, or as otherwise described herein, in accordance with one or more examples.

According to some examples, event recorder 256 may be configured to capture or record data associated with generated path planning, such as selecting an optimal path of travel that is collision-free based on, for example, terminating transit in a specialized orientation and position. Event recorder 256 may also record computed vehicular drive parameters as (or as part of) command data, such as steering data ("s") 241a, throttle data ("t") 242a, braking data ("b") 243a, or any other data ("o") 244a, such as transmission shifting data (e.g., data describing gear and either a forward or reverse direction), for execution by vehicle control unit 223, which, in turn, may generate low-level commands or control signals for application to actuators or other mechanical or electro-mechanical components to cause changes in steering angles, velocity, etc. Further, event recorder 256 may also record applied vehicular drive parameters as (or as part of) command data controlled by a human driver, such as steering data ("s") 241b, throttle data ("t") 242b, braking data ("b") 243b, or any other data ("o") 244b, such as transmission shifting data.

Any functionality of one or more components of autonomy controller 250 (e.g., vehicle controller 254, event recorder 256, and vehicle control unit 223) may be combined with any other component or may be distributed among any number of other components. In one example, either event recorder 256 or vehicle controller 254, or a combination thereof, may be configured to perform one or more functions of an advanced driver assistance system ("ADAS") to control an autonomous vehicle. In some examples, autonomy controller 250 and any of its one or more components may be implemented in hardware or software (or a combination thereof). According to some examples, logic implemented in autonomy controller 250 may include executable instructions based on C++ programming languages, or any other programming language. Note, too, that data may be exchanged within or without an autonomous vehicle via vehicle-to-vehicle ("V2V") data links or vehicle-to-infrastructure ("V2I"), among other communication media, protocols, and technologies.

Figure 3:
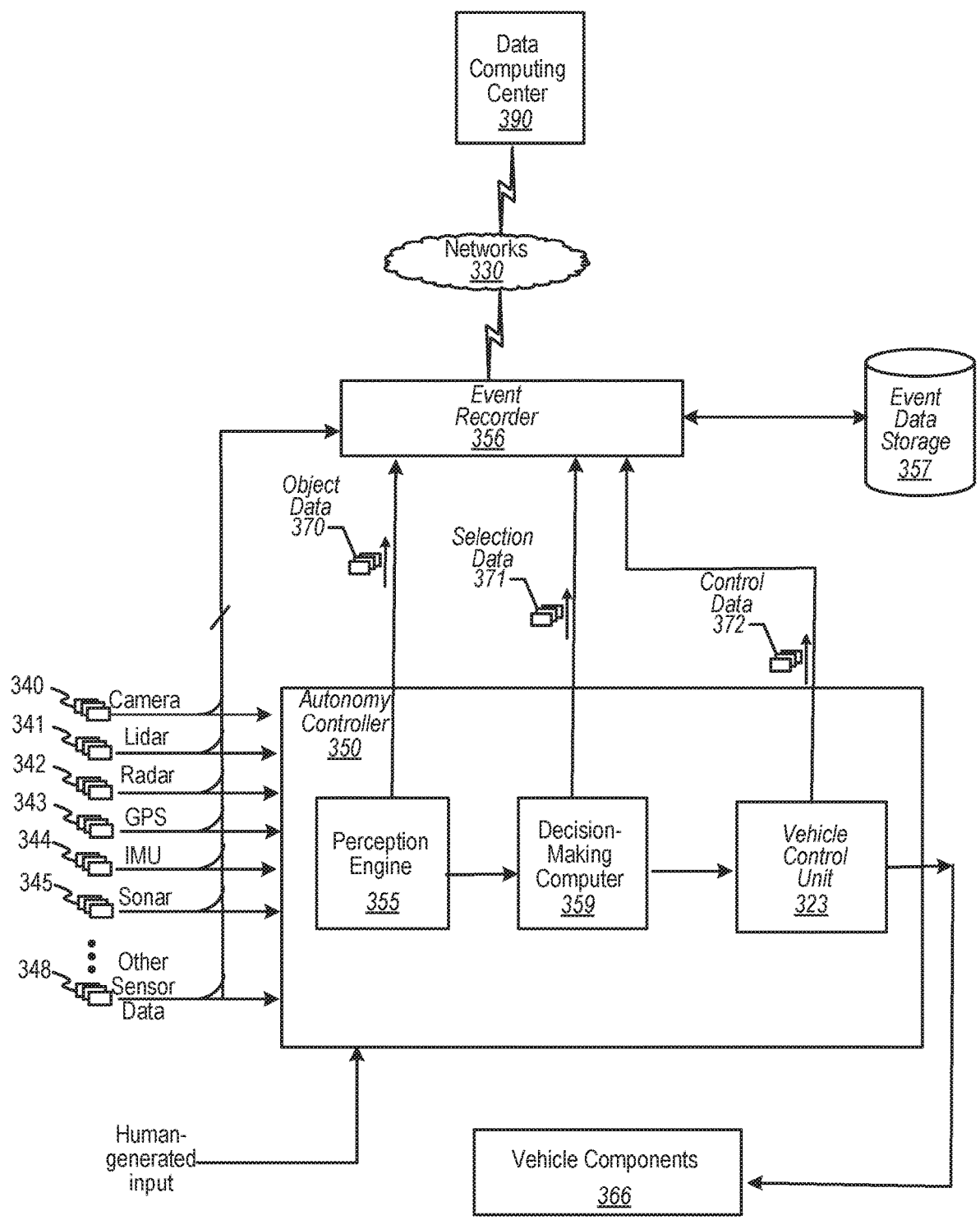
FIG. 3 is a diagram depicting yet another example of an event recorder, according to some embodiments.

In a specific example, one or more components of autonomy controller may be implemented as one or more processors, such as one or more graphics processing units ("GPUs") configured to implement a framework and programming model suitable for GPUs. For example, a programming language, such as 'Compute Unified Device Architecture' ("CUDA")-based language, or any other compatible programming language that may be used to program the GPUs. CUDA™ is produced and maintained by NVIDIA of Santa Clara, Calif. Note that other programming languages may be implemented, such as OpenCL, or any other parallel programming language FIG. 3 is a diagram depicting yet another example of an event recorder, according to some embodiments. Diagram 300 depicts an event recorder 356 disposed external to autonomy controller 350, at least in the example shown. Various examples event recorder 356 may be disposed internal or external to autonomy controller 350, or may have different portions distributed internally or externally. Event recorder 356 is configured to receive data, such as sensor data 342 to 348 and data 370 to 372, each subset of which may be recorded and stored in an event storage repository 357. Such data may be stored continuously for at least an interval of time until the data is purged or overwritten. Upon detection of an event, a subset of data stored in the event storage repository 357 may be preserved for analysis and/or transmission via networks 330 to a data computing center 390, which may be implemented as an event-adaptive computing platform. One or more elements depicted in diagram 300 of FIG. 3 may include structures and/or functions as similarly-named or similarly-numbered elements depicted in other drawings, or as otherwise described herein, in accordance with one or more examples.

Autonomy controller 350 is shown to include a perception engine 355, decision-making computer 359 and a vehicle control unit 323. As shown, autonomy controller 350 may be configured to receive sensor data 342 to 348, which may include camera data 340, lidar data 341, radar data 342, GPS data 343, IMU data 344, sonar data 345, and other sensor data 348. Optionally, autonomy controller 350 may be configured to receive human-generated input data, such as control data originating from a control device, such as steering mechanism or braking mechanism. Perception engine 355 may be configured to receive various subsets of data, and further configured to detect and classify objects, such as objects in object list 230 of FIG. 2, based on characteristics of an object (e.g., object characteristics). A classified object may trigger an indication of an event, such as identifying an environmental anomaly in which a cyclist erroneously and arbitrarily changes its path of travel to intersect that of an autonomous vehicle, thereby creating a potentially hazardous situation. A classified object may include ice, potholes, traffic cones, signs, etc. Any of which may be determined to trigger an event during which at least a subset of data is a recorded by event recorder 356. Perception engine 355 may also be configured to predict locomotive behavior of external objects (e.g., predicting a tree is static or stationary, whereas a cyclist is dynamic and moves). Perception engine 355 may transmit object data 370, which includes data describing one or more objects, to event recorder 356. Also, perception engine 355 may provide data to decision-making computer 359 to assist in deciding one or more courses of action autonomy controller 350 may undertake to control navigation and propulsion of an autonomous vehicle driverlessly. In some examples, perception engine 355 may include one or more functionalities associated with localizer 253 and object organizer 255 of FIG. 2.

Decision-making computer 359 may be configured to determine and planned routes by generating trajectories relative to objects in a surrounding environment, whereby a subset of trajectories may be selected to facilitate collision-free travel. Decision-making computer 359 may also be configured to analyze data from various sources to determine intermediate results or decisions, any of which may be indicative of an event being triggered. Examples of intermediate results or decisions may be an indication that an EPS flag has been set (e.g., indicating situations in which stability control processes may be activated), or a result may include data indicating a human driver assumed control of an autonomous vehicle, thereby intervening with application of computed vehicular drive parameters to control a vehicle autonomously. Intermediate results or decisions may also include one or more commands generated by logic in autonomy controller 350, such as commands relating to generating values of steering angles, velocities, braking pressures, etc. Decision-making computer 359 may transmit results or decision data as selection data 371 to event recorder 356. In some examples, decision-making computer 359 may include one or more functionalities associated with trajectory generator 258 of FIG. 2.

Vehicle control unit 323 may receive decision or result data, including commands, from decision-making computer 359, and may be configured to generate control data 372 that may be transmitted to event recorder 356 for recordation and to vehicle components 366 to effect autonomous driving. Vehicle components 366 may include electrical components, mechanical components, such as brakes, actuators, etc. Note that in some examples, autonomy controller 350 may generate control data 372 continuously, including during intervals of time in which a human user generates control signals that are applied to vehicle components 366. When the human user is driving, autonomy controller 350 may prevent application of control data 372 to vehicle components, and such data may be recorded by event recorder 356 for subsequent comparison at data computing center 390 relative to human input (e.g., determining whether a human driver an autonomous controller 350 operated similarly or in direct conflict, such as during an event).

Figure 4:
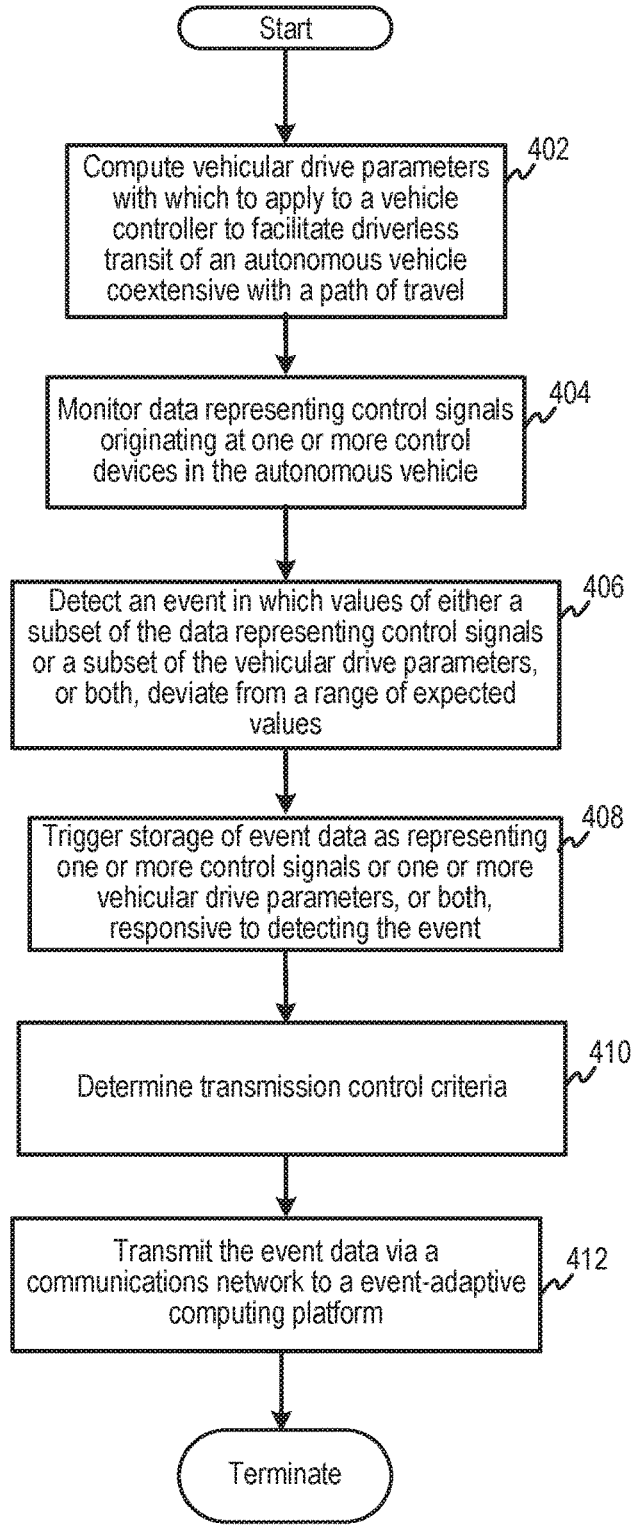
FIG. 4 is a flow diagram depicting an example of operation of an event recorder, according to some embodiments.

FIG. 4 is a flow diagram depicting an example of operation of an event recorder, according to some embodiments. Flow 400 begins at 402, at which an autonomy controller may compute vehicular drive parameters that may be applied to a vehicle controller to facilitate driverless transit of autonomous vehicle via a path of travel. An autonomous vehicle, as described with respect to flow 400 or any other figure, may refer to any vehicle that has logic or an automated driving system configured to perform any level of automated driving, according to various embodiments. For example, an autonomous vehicle may refer to a level 4 automated vehicle (e.g., "high automation"), as well as an automated vehicle at level 3 (e.g., conditional automation) or at level 5 (e.g., full automation), whereby such levels are defined by SAE International ("SAE") of Warrendale, Pa., USA, or as adopted by the National Highway Traffic Safety Administration of Washington, D.C., USA. An autonomous vehicle, as described herein, may be described as an "autonomous-capable vehicle," which can be controlled by either a human or autonomous logic, or both, under any condition, at least in some examples.

At 404, data representing control signals originate in one or more control devices in an autonomous vehicle may be monitored. In some examples, one or more control signals may originate from one or more control devices (e.g., a steering wheel, a brake pedal, a throttle pedal, a transmission shifter, etc.) receiving control input from a human user. According to various examples, sensor data signals originating on one or more sensors internal or external to an autonomous vehicle may be monitored, whereby at least a subset of values representing sensor data signals may be stored in an event storage repository At 406, an event may be detected. In some examples, a detected event comprises values of either a subset of data representing control signals (e.g., applied vehicular drive parameters, which may be user-generated) or a subset of computed vehicular drive parameters, which may be generated by autonomous logic), or both, deviate from a range of expected values. In one example, consider that an event has been classified as a behavior anomaly based on, for example, inconsistencies between at least one value of a control signal originating at a human user input and at least one value of a computed vehicular drive parameter. For example, an autonomy controller may compute a wheel or tire angle of 10 degrees to negotiate a curve, whereas a user may apply input to a steering wheel to cause a wheel or tire to turn at an angle of 35 degrees. The discrepancy or difference between angles may be sufficient to trigger an indication that an event has occurred.

In some examples, an event recorder and/or event-adaptive computing platform, absent other factors, may analyze a user's driving behavior to classify the type of driver and driving experience that the user prefers. An analysis performed at either an autonomy controller or an event-adaptive computing platform may classify the user as a "sport" driver that prefers "aggressive" driving and handling performance characteristics (e.g., relative to a population of drivers). Thus, event-adaptive computing platform may either generate updated software to implement "sport" driving characteristics or modify threshold ranges so as to prevent false-event determinations should the driver wish to operate safely beyond the normative driver.

In other examples, inconsistencies (e.g., deviations from a range of one or more expected values) between user input values (e.g., applied vehicular drive parameters) and computed vehicular drive parameters of an autonomy controller may be deemed an event. For example, when an autonomous vehicle encounters a slippery surface, such as ice, and begins to skid, an autonomy controller may be configured to compute tire angles to steer the vehicle "into" a skid to optimally recover control. The computed tire angles may constitute data representing a selected course of action based on an object (e.g., patch of ice as identified via capture device) and/or on different angular velocities of tires indicative of a lack of traction for at least one tire. However, the user may intervene to override the application of computed vehicular drive parameters by assuming control. If the user turns "away" from the skid, which is counter to the commands generated by autonomous logic, such an action may be deemed an event as a user chooses to apply suboptimal control signals to address a skid. Thus, an event recorder may detect at least one control signal (e.g., a steering control input) that deviates from one or more values for at least one vehicular drive parameter (e.g., computed tire angles) for a particular situation or condition. As such, computed tire angles (and associated throttle or brake amounts) may be stored in an event storage repository for subsequent transmission as a function of transmission criteria. In at least one case, a user intervention such as steering away from the skid may be deemed at an event associated with a behavior anomaly, as well as a detection of a slippery roadway surface due to, for example, ice, which may be considered an environmental anomaly.

At 406, a pothole or other roadway defect or obstacle may be identified as an environmental anomaly which, in turn, may be deemed to trigger a description of said defect or obstacle as an event. In operation, an autonomy controller may detect an event and then select data representing a course of action based on the event (e.g., an object in a path of travel may be deemed or determined to be an obstacle). The autonomy controller may classify an object as a traffic cone, a patch of ice, a pothole, or the like. For a particular object, such as a pothole, an autonomy controller can select at least one set of executable instructions to implement a course of action or rule to generate a subset of vehicular drive parameters to address (e.g., avoid) the pothole.

At 406, an unpredictable dynamic object, such as an errant cyclist, may be identified as an environmental anomaly which, in turn, may also be classified as an event. For example, consider that an autonomy controller may be configured to predict a subset of trajectories relative to a detected object, such as a dynamic object. An event may be detected upon determining a subset of trajectories of an autonomous vehicle may intersect a path of travel of the object (e.g., cyclist), thereby possibly causing a collision. An autonomy controller may be further configured to predict the path of displacement of a cyclist (e.g., a dynamic object) to predict a probability that a trajectory of an autonomous vehicle may intersect the path of displacement. Based on the probability and the object characteristics of an object (e.g., cyclists may travel faster than a pedestrian), an autonomy may be configured to select a course of action to facilitate collision-free travel. In some cases, event data associated with the cyclist may be transmitted to an event-adaptive computing platform to analyze various aspects of the event (e.g., whether the object was correctly classified as a cyclist, whether another course of action may have been more optimal, etc.). After the analysis, updated software or autonomous logic may be transmitted back to an autonomous vehicle to update the autonomous logic.

At 406, an event may arise indicating at least one sensor internal or external to an autonomous vehicle is operating sub-optimally, or is an operable. Thus, the event may be classified as a vehicle anomaly. In one example, an autonomy controller may be configured to execute instructions to perform vehicle diagnostics to generate data characterizing vehicle anomaly. The characterized vehicle anomaly may be stored for subsequent transmission in association with event data. For example, an event recorder may detect an event in which values of one or more sensor data signals deviate from a range of expected sensor values.

At 408, detection of an event may trigger event data to be stored. In various examples, the event data may represent one or more control signals or one or more vehicular drive parameters, or both. At 410, transmission control criteria may be determined, whereby event data may be transmitted in accordance with the transmission control criteria to facilitate data transfer to an event-adaptive computing platform at 412.

Figure 5:
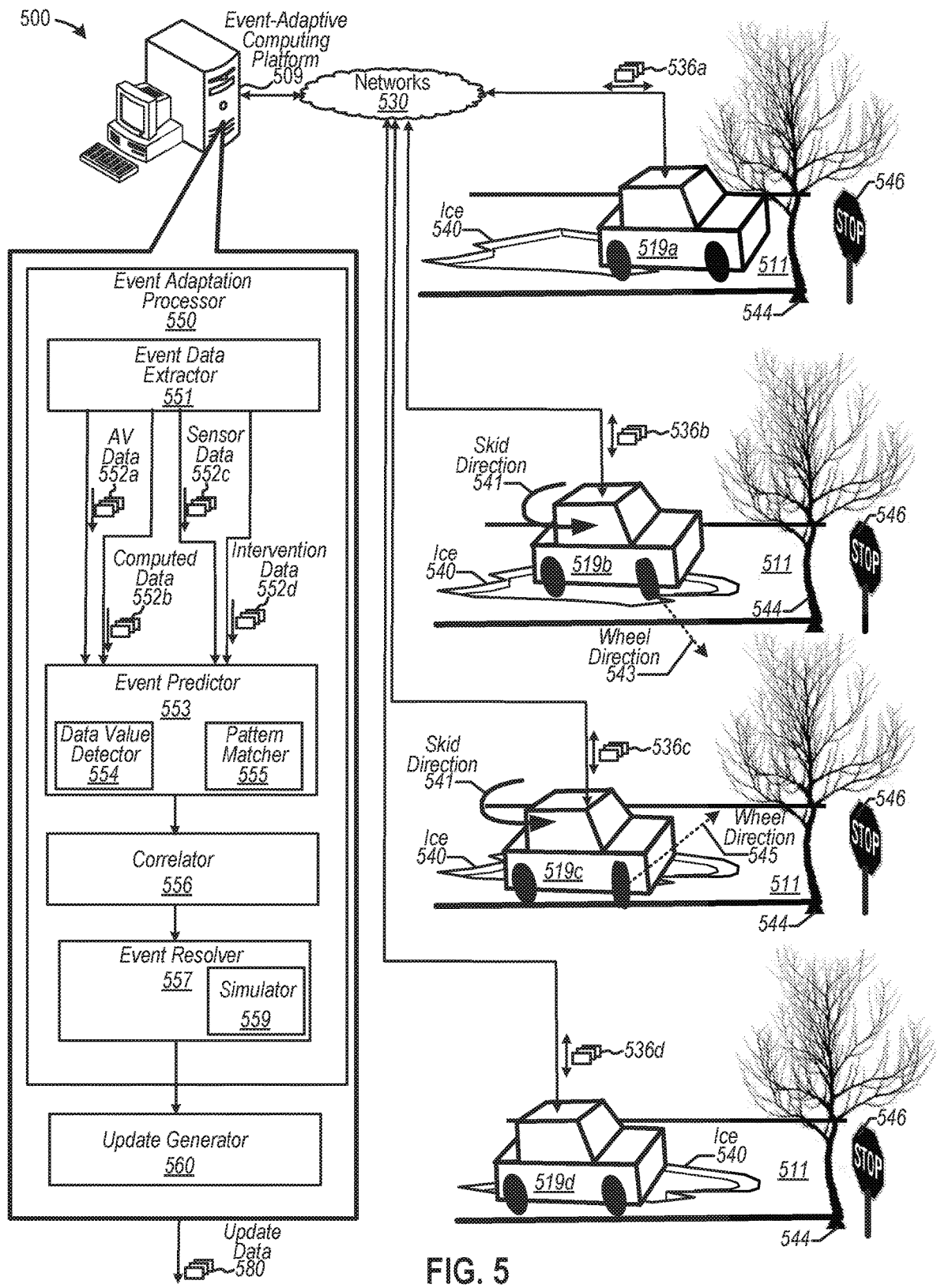
FIG. 5 is a diagram depicting an example of an event adaptation processor implemented in association with an event-adaptive computing platform, according to some examples.

FIG. 5 is a diagram depicting an example of an event adaptation processor implemented in association with an event-adaptive computing platform, according to some examples. Diagram 500 depicts an event-adaptive computing platform 509 including an event adaptation processor 550 and an update generator 560 to generate update data 580. Event-adaptive computing platform 509 may include logic configured to receive data (e.g., remotely) from numerous autonomous vehicles 519a, 519b, 519c, and 519d, and to correlate one or more transmitted patterns of data (e.g., event data). Such patterns of data may be indicative of "non-normative" events occurring at any of autonomous vehicles 519a, 519b, 519c, and 519d during an event in which, for example, human intervention is asserted to control an autonomous vehicle 519. During such situations, human-provided inputs may deviate to a specific degree (e.g., a threshold range of one more parameter values) from computed vehicular drive parameters (e.g., trajectories), pre-programmed input (e.g., drive parameters based on rules), or dynamically-generated logic, such as path planning rules.

Examples of such path planning rules may include prohibitions against automatically driving through red lights or crossing a double yellow line during periods of high traffic. Computing logic also receives contextual data, such as time of day as well as geographic data such as locations (e.g., GPS coordinates) for a subset of autonomous vehicles 519a, 519b, 519c, and 519d. As an example, a subset of autonomous vehicles may have a human operator who assumes control in order to drive through a malfunctioning traffic light (not shown) at an intersection of San Antonio Road and El Camino Real in which the traffic light is blinking red in all directions (indicating that all vehicles must stop and proceed individually through the intersection when safe to do so).

As an example of an exception or deviation from path planning rules, an analysis of data gathered by autonomous vehicle logic at an autonomous vehicle may be transmitted for analysis at event-adaptive computing platform 509. A result may be an update to software that improves the onboard autonomous vehicle logic to, for example, permit a vehicle to move through an intersection when a traffic control authority is detected, no obstacles are present, and, upon authorization from said authority to enter the intersection, or upon other rules or conditions. In another example, illegally parked vehicles or trees may occlude sensing (e.g., imagery, lidar, radar, etc.) of nearby pedestrians or traffic signs when an autonomous vehicle approaches.

Event adaptation processor 550 may operate to aggregate human inputs and responses over a population of autonomous vehicle drivers. The aggregated human responses may be correlated with each other and/or with computed vehicle decisions to provide for real-time (or substantially real-time) updates to autonomous vehicle logic and rules so as to optimally navigate such events. Computing logic of event adaptation processor 550 may also derive data representing enhanced autonomous responses that may be downloaded into local autonomous vehicle memory or firmware to address non-normative events. Various machine and/or deep learning techniques may be applied.

Diagram 500 depicts an example of an event adaption processor 550 being configured to identify one or more anomalies associated with an event, and to determine one or more courses of action to resolve such anomalies, including generating updates to data and/or executable instructions. In the example shown, event adaption processor 550 receives event data 536a, 536b, 536c, and 536d via networks 530 from respective autonomous vehicles 519a, 519b, 519c, and 519d, each traveling the same roadway 511 and encountering the same stop sign 546. Furthermore, each of autonomous vehicles 519a, 519b, 519c, and 519d encounters roadway conditions that include iced surface 540, the roadway being oriented downhill (not shown). The view of stop sign 546 is obstructed by tree 544 and may not be readily perceived by a human or image sensors until an autonomous vehicle is very close to stop sign 546, which reduces the human driver's reaction time. Event recorders (not shown) in each autonomous vehicle may detect one or more events. One event may be responsive to a human driver intervening to apply hard brakes to stop the vehicle. Another event may include detection of skidding tires (e.g., of autonomous vehicles 519b and 519c). Note that either a driver or an autonomy controller of autonomous vehicle 519b is turning the wheels in direction 543, which is in the direction of the skid. Yet another event may include detection of a driver turning away (e.g., wheels turned into direction 545) from the direction of the skid 541, which may be inapposite and inconsistent with application of rules by an autonomous controller that generate drive parameters to steer autonomous vehicle into the direction of the skid.

Event adaptation processor 550 is shown to include an event data extractor 551, an event predictor 553, a correlator 556, and an event resolver 557. Event data extractor 551 is configured to receive event data 536a, 536b, 536c, and 536d, and then extract autonomous vehicle data ("AV data") 552a, computed data 552b, sensor data 552c, and intervention data 552d. AV data 552 may include data representing computed vehicular drive parameters, whereas computed data 552b may include data representing derived data (e.g., derived by an autonomy controller), such as detected and classified objects in an environment. Intervention data 552d may include data representing applied vehicular drive parameters that may generated responsive to human driver input at a control device.

Event predictor 553 is configured to identify an event and its characteristics. For example, event predictor 553 may be configured to analyze data 552a to 552d to determine an event and associated one or more behavioral, vehicular, and environmental anomalies. Event predictor 533 is shown to include a data value detector 554 and a pattern matcher 555. Data value detector 554 may be configured to detect one or more data values surpass a threshold or are in a range of values indicative of non-normative operation. Pattern matcher 555 may be configured to match event data 536a to 536b against patterns of other stored event data to determine a match specifying, for example, "skidding" as an event.

Correlator 536 may be configured to correlate one or more subsets of event data 536a to 536d. For example, correlator 536 may determine that autonomous vehicles 519a, 519b, 519c, and 519d transited over roadway 511 within a common time period in which icy conditions exist. Further, correlator 536 may determine that autonomous vehicles 519a, 519b, and 519c stopped abnormally fast, whereas autonomous vehicle 519d stopped at a normative rate of deceleration. Event adaption processor 550 may analyze correlated data to determine that, based on historic GPS data, autonomous vehicle 519d has traveled over roadway 511 many times before, but autonomous vehicles 519a, 519b, and 519c each encounter to stop sign 546 for the first time during the event.

Event resolver 557 includes a simulator 559, which can simulate of the application of various values for one or more of the control signals, the sensor data, and the subset of computed vehicular drive parameters to test and resolve the type of event. Event resolver 557 may include logic to determine an optimal resolution, such as generating executable instructions to begin braking earlier at a sufficient distance to decelerate at a rate that minimizes skidding in icy conditions. Further, event resolver 537 may be configured to modify map data to include stop sign 546 for future use. Update generator 560 may be configured to generate an updated version of autonomy software (e.g., a patch) to download to autonomous vehicles to reduce or eliminate similar events.

According to various examples, event adaptation processor 550 may be configured to generate normative models of pedestrians, vehicles, and other objects based on vehicle data aggregated at event-adaptive computing platform 509. Geo-localized models may be transmitted to autonomous vehicles to predict classification and types of objects as well as potential movements of dynamic objects. An autonomy controller may compare observed data against modeled predictive data to detect an event. For example, if an error between two measurements exceeds a threshold, an event recorder (not shown) may be configured to store the data related to the event, such as 30 seconds before and 30 seconds after a triggering signal is generated. According to various examples, the time during which event data is stored prior and subsequent to an event may be a function of the type of event. For example, certain events may have five minutes recorded prior to an event and six minutes recorded subsequent the event. The streamed event data may be processed at event-adaptive computing platform 509 to re-compute vehicle and pedestrian models, which thereafter may be simulated and applied in an update of software to validate the recomputed vehicle and pedestrian models.

Note that event adaption processor 550 may compute global and local scene features, for example, GIST, for a camera image so that computed features can be used to detect anomalies or an event. In some examples, a combination of one or more of unsupervised clustering (e.g., such as K-means), supervised machine learning (e.g., support vector machine, etc.), deep learning methods, and hierarchical temporal memory (e.g., "HTM" and sparse data representation) may be implemented to detect anomalies, such as debris or objects falling out of the back of a leader vehicle.

Figure 6:
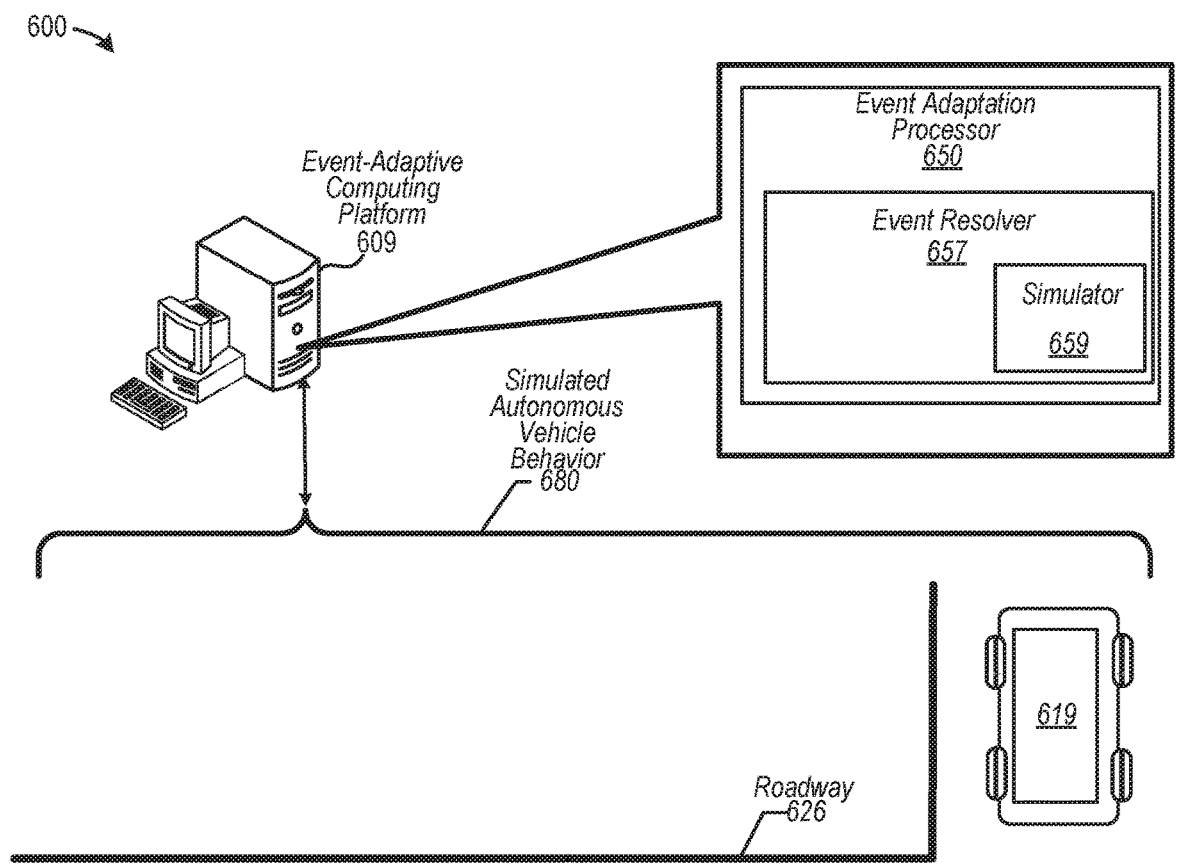
FIG. 6 is a diagram acting an example of an event-adaptive computing platform configured to resolve an event, according to some examples.
Figure 6:
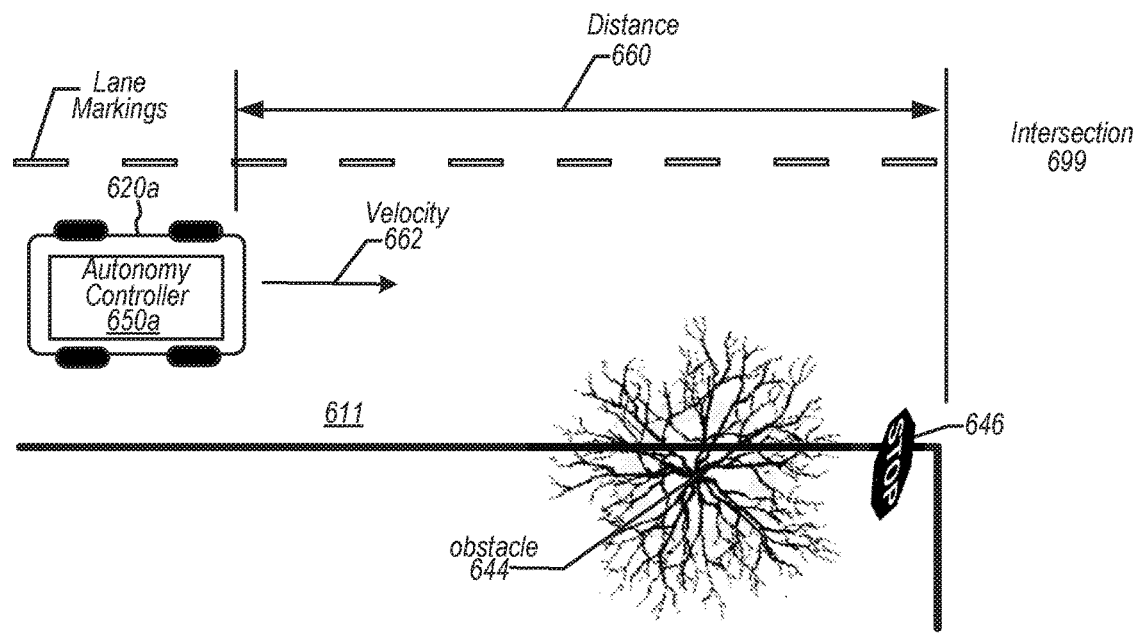

FIG. 6 is a diagram acting as an example of an event-adaptive computing platform configured to resolve an event, according to some examples. Diagram 600 depicts an event-adaptive computing platform 609, which includes an event adaptation processor 650. Event adaptation processor 650 is shown to include an event resolver 657, which, in turn, includes a simulator 659. Event adaptation processor 650 may be configured to adapt operations of various components or subsystems of an autonomous vehicle 620 to resolve subsequent similar events, thereby enhancing safety, user experience, vehicle performance, etc. Simulator 659 may be configured to generate simulated autonomous vehicle behavior 680 associated with an event. For example, consider that one or more drivers or autonomy controllers 650a in different vehicles fail to perceive a stop sign 646 (i.e., not in map data) due to a tree 644 interfering the visibility of stop sign 646, and, thus, may perceive stop sign 646 with little reaction time, thereby causing heavy amounts of brake pressure to effect an immediate stop. To ensure sufficient time to stop to avoid a collision with vehicle 619 at intersection 699, event resolver 657 may control the simulation so as to test various "corner cases," whereby one or more control signals, sensor data values, and computed vehicular drive parameters may operate beyond normative ranges of operation during an event.

Simulator 659 can simulate of the application of various values for one or more of the control signals, the sensor data, and the subset of computed vehicular drive parameters to test and resolve the type of event. For example, application of brake pressure may be implemented at various time intervals preceding detection of stop sign 646 at various distances 660 and at various velocities 682. In association with road characteristics of lane 611 of roadway 626, Simulator 659 can modify various parameters, including one or more roadway characteristics, which may include a degree of traction at surface, type of road material (e.g., pavement, asphalt, etc.), whether lane 611 is sloped uphill or downhill (and by how much), a degree of slipperiness during rain or icing conditions, etc. After a number of simulations, consider that event resolver 657 identifies a time interval of "2.4 seconds" at which to optimally apply brakes regardless whether stop sign 646 may be detected or perceived. Event resolver 657 may also be configured to update map data to include stop sign 699 at the location adjacent intersection 699. One or more of the components described in FIG. 6, as well as other figures, may be implemented in either hardware or software, or any combination thereof.

Figure 7:
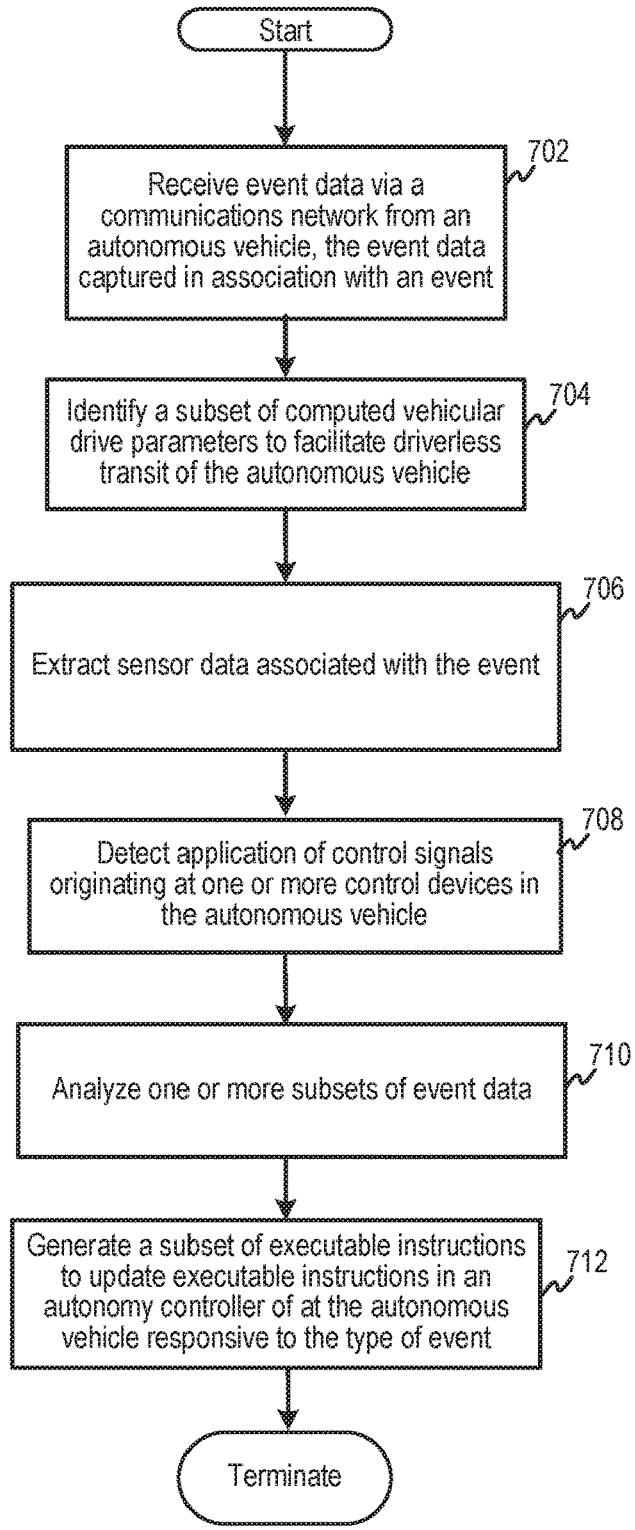
FIG. 7 is a flow diagram depicting an example of an, according to some embodiments.

FIG. 7 is a flow diagram depicting an example of an, according to some embodiments. Flow 700 begins at 702, at which event data may be received via a communications network from an autonomous vehicle. The event data may be captured in association with an event at an event recording device in an autonomous vehicle. At 704, a subset of computed vehicular drive parameters may be identified, the computed vehicular drive parameters being used to facilitate driverless transit of an autonomous vehicle. At 706, sensor data, such as temperature data, lidar data, camera data, etc., associated with the event may be extracted from data received via data transfer from the autonomous vehicle.

At 708, application of control signals originating at one or more control devices in the autonomous vehicle may be detected. For example, applied vehicular drive parameters may be applied to a steering mechanism responsive to a human driver turning a steering wheel 5 degrees. In some examples, the application of the control signals may be due to a human driver intervening with the autonomous control of the vehicle, whereby the human intervention can be detected and, in some cases, identified as an event. Data specifying that one or more computed vehicular drive parameters are overridden by human intervention can be identified at, for example, an event-adaptive computing platform. Values of control signals applied responsive to human driver intervention may be characterized relative to the computed vehicular drive parameters. For example, consider an event in which a stop sign may not be readily detectable by camera. Also, the stop sign is not identifiable in a map or map data.

In one implementation, driver behavior may be classified and compared to other driver behaviors relative to the stop sign to determine whether the environmental anomaly (i.e., occluded stop sign) may actually be a behavior anomaly (e.g., the driver associated with event is aggressive and tends to "slam the brakes."). For example, driving behavior of a number of drivers may be aggregated to determine whether a significant subpopulation of drivers behave similarly. Other extracted sensor data may be analyzed to determine at that location (e.g., using GPS data) that a tree is blocking the view of stop sign by a driver or a camera.

At 710, the control signals, the sensor data, and the subset of computed vehicular drive parameters may be analyzed, for example, at an event-adaptive computing platform to identify a type of event. For example, one or more values of the control signals may be determined (e.g., a number of degrees a tire is turned in response to human input, or an amount of pressure applied to a brake pedal). Also, one or more values of sensor data may be determined (e.g., a value from an odometry sensor, GPS coordinates, image data, etc.). Further, a subset of computed vehicular drive parameters associated with the type of event, such as computed throttle values, may be determined.

To resolve the event, one or more values may be modified to identify or determine optimal autonomous vehicle operation. For example, consider that one or more drivers or autonomy controllers in different vehicles fail to perceive a stop sign (i.e., not in map data) due to a tree interfering the visibility of the sign, and, thus, may perceive the stop sign with little reaction time, thereby causing heavy amounts of brake pressure to effect an immediate stop. In some cases, an event-adaptive computing platform may include a simulator to simulate of the application of one or more of the control signals, the sensor data, and the subset of computed vehicular drive parameters to test for resolving the type of event. For example, application of brake pressure may be implemented at various time intervals preceding detection of a stop sign. A time interval of "2.4 seconds" may be identified from a number of different time intervals as a value to resolve the event. Additionally, map data may be updated to include a stop sign at the location.

At 712, a subset of executable instructions may be generated for transmission or download via a network to update executable instructions in an autonomy controller at the autonomous vehicle responsive to the type of event. The subset of executable instructions may be transmitted via WiFi, cellular, or any other communication network to the autonomous vehicle for updating the executable instructions in the autonomy controller. The update may apply one or more adapted vehicular drive parameters, such as an earlier point in time or distance at which to apply brakes when approaching an occluded stop sign.

In other examples, flow 700 may be implemented to identify a behavior classification associated with a subset of control signals to classify a human driver in accordance with the behavior classification (e.g., cautious driver, aggressive driver, distracted driver, etc.). An event-adaptive computing platform may be configured to generate one or more ranges of computed vehicular drive parameters to adapt to the behavior classification. For example, computed throttle settings may adapt accelerations rates to the type of driver (e.g., cautious drivers accelerate sleep more slowly than aggressive drivers). Responsive to a pattern of human driver intervention, such as detected rates of acceleration or braking and aggressiveness of driver turns, data representing adapted vehicular drive parameters may be formed (e.g., generated) and transmitted to an autonomous vehicle for implementation.

Figure 8:
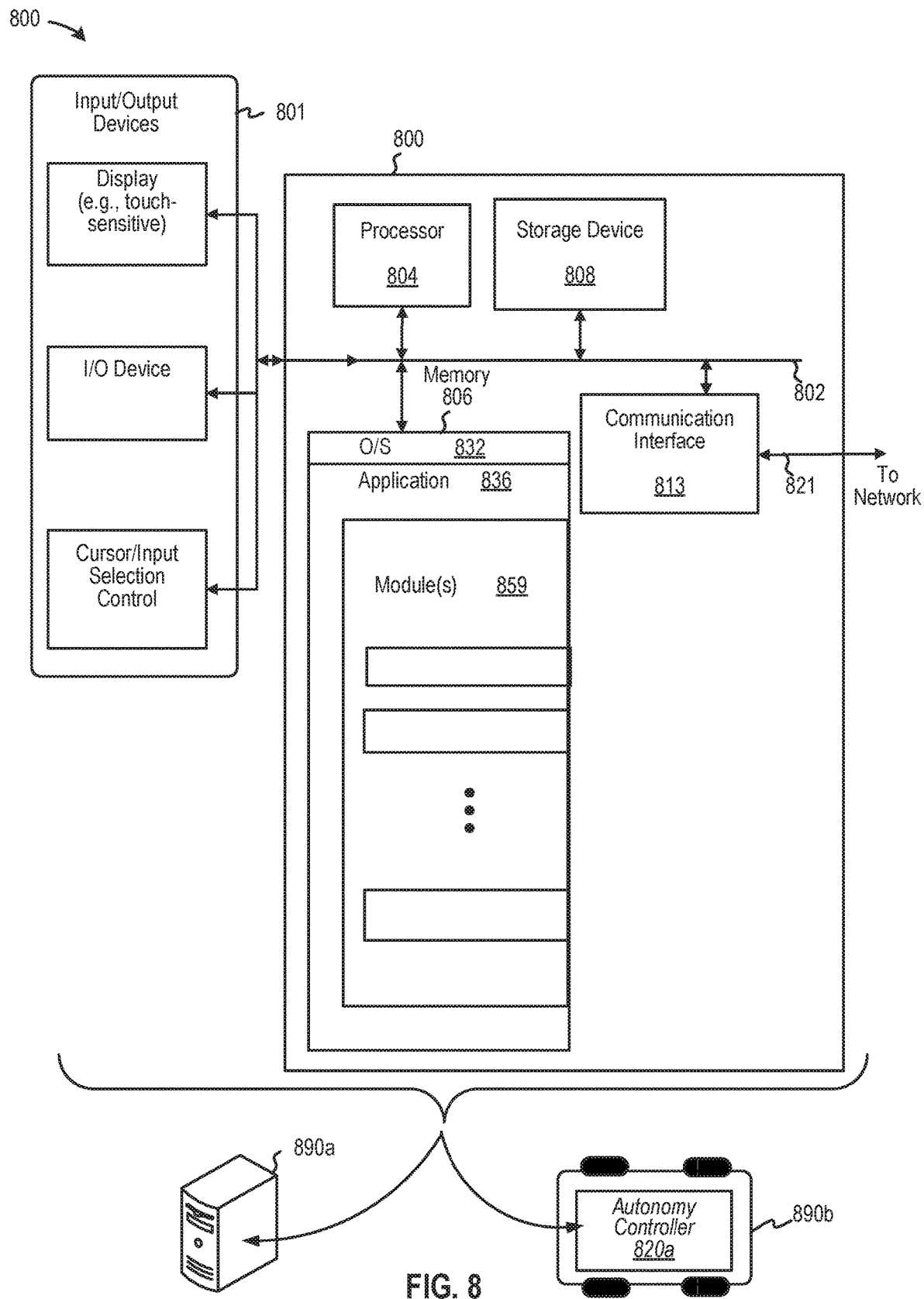
FIG. 8 illustrates examples of various computing platforms configured to provide various functionalities to components of an autonomy controller and/or an event-adaptive computing platform, according to various embodiments.

FIG. 8 illustrates examples of various computing platforms configured to provide various functionalities to components of an autonomy controller or an event-adaptive computing platform, according to various embodiments. In some examples, computing platform 800 may be used to implement computer programs, applications, methods, processes, algorithms, or other software, as well as any hardware implementation thereof, to perform the above-described techniques.

In some cases, computing platform 800 or any portion (e.g., any structural or functional portion) can be disposed in any device, such as a computing device 890*a*, autonomous vehicle 890*b*, and/or a processing circuit in forming structures and/or functions of an autonomy controller 820*a*, according to various examples described herein.

Computing platform 800 includes a bus 802 or other communication mechanism for communicating information, which interconnects subsystems and devices, such as processor 804, system memory 806 (e.g., RAM, etc.), storage device 808 (e.g., ROM, etc.), an in-memory cache (which may be implemented in RAM 806 or other portions of computing platform 800), a communication interface 813 (e.g., an Ethernet or wireless controller, a Bluetooth controller, NFC logic, etc.) to facilitate communications via a port on communication link 821 to communicate, for example, with a computing device, including mobile computing and/or communication devices with processors, including database devices (e.g., storage devices configured to store atomized datasets, including, but not limited to triplestores, etc.). Processor 804 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 800 exchanges data representing inputs and outputs via input-and-output devices 801, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 801 may be implemented as, or otherwise substituted with, a user interface in a computing device associated with a user account identifier in accordance with the various examples described herein.

According to some examples, computing platform 800 performs specific operations by processor 804 executing one or more sequences of one or more instructions stored in system memory 806, and computing platform 800 can be implemented in a client-server arrangement, peer-to-peer arrangement, or as any mobile computing device, including smart phones and the like. Such instructions or data may be read into system memory 806 from another computer readable medium, such as storage device 808. In some examples, hard-wired circuitry may be used in place of or in combination with software instructions for implementation. Instructions may be embedded in software or firmware. The term "computer readable medium" refers to any tangible medium that participates in providing instructions to processor 804 for execution. Such a medium may take many forms, including but not limited to, non-volatile media and volatile media. Non-volatile media includes, for example, optical or magnetic disks and the like. Volatile media includes dynamic memory, such as system memory 806.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1302 for transmitting a computer data signal.

In some examples, execution of the sequences of instructions may be performed by computing platform 800. According to some examples, computing platform 800 can be coupled by communication link 821 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 800 may transmit and receive messages, data, and instructions, including program code (e.g., application code) through communication link 821 and communication interface 813. Received program code may be executed by processor 804 as it is received, and/or stored in memory 806 or other non-volatile storage for later execution.

In the example shown, system memory 806 can include various modules that include executable instructions to implement functionalities described herein. System memory 806 may include an operating system ("O/S") 832, as well as an application 836 and/or logic module(s) 859. In the example shown in FIG. 8, system memory 806 may include any number of modules 859, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques, including, but not limited to, FORTH, ASP, ASP.net, .Net framework, Ruby, Ruby on Rails, C, Objective C, C++, C#, Adobe® Integrated Runtime™ (Adobe® AIR™) ActionScript™, Flex™, Lingo™, Java™, Javascript™, Ajax, Perl, COBOL, Fortran, ADA, XML, MXML, HTML, DHTML, XHTML, HTTP, XMPP, PHP, and others. Design, publishing, and other types of applications such as Dreamweaver®, Shockwave®, Flash®, Drupal and Fireworks® may also be used to implement at least one of the described techniques or variations thereof. Database management systems (i.e., "DBMS"), search facilities and platforms, web crawlers (i.e., computer programs that automatically or semi-automatically visit, index, archive or copy content from, various websites (hereafter referred to as "crawlers")), and other features may be implemented using various types of proprietary or open source technologies, including MySQL, Oracle (from Oracle of Redwood Shores, Calif.), Solr and Nutch from The Apache Software Foundation of Forest Hill, Md., among others and without limitation. The described techniques may be varied and are not limited to the examples or descriptions provided. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 859 of FIG. 8, or one or more of their components, or any process or device described herein, can be in communication (e.g., wired or wirelessly) with a mobile device, such as a mobile phone or computing device, or can be disposed therein.

The computing device may be disposed in autonomous vehicle 890b as autonomy controller 820a.

In some cases, a mobile device, or any networked computing device (not shown) in communication with one or more modules 1359 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 859 or one or more of its/their components, or any process or device described herein, can be implemented in one or more computing devices (i.e., any mobile computing device) that may include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, modules 859 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A method comprising:
   computing vehicular drive parameters to apply to a vehicle controller that uses the vehicular drive parameters to control driving operations of an autonomous vehicle through one or more control devices of the autonomous vehicle to facilitate driverless transit of the autonomous vehicle coextensive with a path of travel;
   monitoring data representing control signals applied to the one or more control devices in the autonomous vehicle, the control signals originating from a source different than a source of the vehicular drive parameters;
   detecting an event when a difference between a value of one of the control signals as indicated by the monitored data and a value of one of the vehicular drive parameters exceeds a threshold, the event indicating that a type of anomaly has occurred along the path of travel that contributed to the difference;
   triggering, in response to detecting the event, storage of event data about the event;
   determining transmission control criteria for the event data; and
   transmitting, based on the transmission control criteria, the event data via a communications network to a logic adaption computing platform that is external to the autonomous vehicle.

2. The method of claim 1, wherein the one of the control signals and the one of the vehicular drive parameters relate to a same type of driving operation for the autonomous vehicle, wherein the vehicular drive parameters comprise one or more of a degree of wheel angle, an amount of throttle, an amount of brake pressure, and a state of transmission and further comprising:
   classifying the type of anomaly as a behavior anomaly associated with driving behavior of a driver of the autonomous vehicle.

3. The method of claim 1, further comprising:
   monitoring sensor data signals originating at one or more sensors in the autonomous vehicle;
   receiving a subset of sensor data based on the sensor data signals;
   identifying object characteristics associated with the subset of sensor data; and
   classifying an object based on the identified object characteristics.

4. The method of claim 3, further comprising one or more of:
   detecting at least one control signal of the control signals deviating from a range of values for the one of the vehicular drive parameters;
   storing data representing the at least one control signal and the one of the vehicular drive parameters for transmission in association with the event data;
   classifying the type of anomaly as an environmental anomaly associated with an environment of the autonomous vehicle that affect one or more performance characteristics of the autonomous vehicle;
   selecting data representing a course of action based on the object; and identifying the course of action based on:
classifying the object; and
selecting at least one set of executable instructions to implement a rule to generate a subset of the vehicular drive parameters based on the object.

5. The method of claim 4, further comprising:
predicting a subset of trajectories relative to the object;
detecting the event in which a trajectory of the autonomous vehicle is associated with the object, the trajectory being based on the vehicular drive parameters;
predicting a path of displacement of the object, the object being a dynamic object;
determining a probability of a trajectory of the autonomous vehicle is associated with the path of displacement; and
selecting data representing a course of action based on the probability and the object.

6. The method of claim 3, further comprising:
executing instructions to perform vehicle diagnostics to generate data characterizing vehicle anomaly; and
storing characterized vehicle anomaly data for transmission in association with the event data.

7. The method of claim 3, further comprising:
detecting the event when values of the sensor data signals deviate from a range of expected sensor values;
classifying the type of anomaly as a vehicle anomaly associated with a malfunctioning component of the autonomous vehicle;
executing instructions to perform vehicle diagnostics to generate data characterizing vehicle anomaly; and
storing characterized vehicle anomaly data for transmission in association with the event data.

8. An apparatus comprising:
a memory including executable instructions; and
a processor, responsive to executing the executable instructions, that:
computes vehicular drive parameters to apply to a vehicle controller that uses the vehicular drive parameters to control driving operations of an autonomous vehicle through one or more control devices of the autonomous vehicle to facilitate driverless transit of the autonomous vehicle coextensive with a path of travel;
monitors data representing control signals applied to the one or more control devices in the autonomous vehicle, the control signals originating from a source different than a source of the vehicular drive parameters;
detects an event when a difference between a value of one of the control signals as indicated by the monitored data and a value of one of the vehicular drive parameters exceeds a threshold, the event indicating that a type of anomaly has occurred along the path of travel that contributed to the difference;
triggers, in response to detecting the event, storage of event data about the event;
determines transmission control criteria for the event data; and
transmits, based on the transmission control criteria, the event data via a communications network to a logic adaption computing platform that is external to the autonomous vehicle.

9. The apparatus of claim 8, wherein the processor further:
classifies the type of anomaly as a behavior anomaly.

10. The apparatus of claim 8, wherein the processor further:
monitors sensor data signals originating at one or more sensors in the autonomous vehicle;
receives a subset of sensor data based on the sensor data signals;
identifies object characteristics associated with the subset of sensor data;
classifies an object based on the identified object characteristics; and
classifies the type of anomaly as an environmental anomaly.

11. A method comprising:
receiving, by a processor, event data via a communications network from an autonomous vehicle, the event data captured in association with an event that occurred along a path of travel of the autonomous vehicle, the event being detected when a difference between a value of a vehicular drive parameter and a value of a control signal exceeds a threshold, wherein the vehicular drive parameter and the control signal originate from different sources and are used to control driving operations of the autonomous vehicle through one or more control devices of the autonomous vehicle;
extracting, by the processor, sensor data associated with the event;
analyzing, by the processor, the control signal, the sensor data, and the vehicular drive parameter to identify a type of the event; and
generating, by the processor and based on the type of the event, a subset of executable instructions to update executable instructions in an autonomy controller of the autonomous vehicle to alter autonomous operation of the autonomous vehicle for a future trip along the path of travel.

12. The method of claim 11, further comprising:
transmitting, by the processor, the subset of executable instructions to the autonomous vehicle to update the executable instructions in the autonomy controller.

13. The method of claim 11, wherein the control signal originates from human driver intervention.

14. The method of claim 13, wherein the vehicular drive parameter originates from the autonomy controller.

15. The method of claim 11, further comprising:
correlating, by the processor, control signals including the control signal to identify subsets of control signals;
aggregating, by the processor, the control signals in each subset of control signals; and
characterizing, by the processor, behaviors associated with application of the control signals.

16. The method of claim 11, further comprising:
identifying, by the processor, a behavior classification associated with a subset of control signals including the control signal;
classifying, by the processor, a human driver in accordance with the behavior classification;
generating, by the processor, one or more ranges of vehicular drive parameters including the vehicular drive parameter to adapt to the behavior classification;
forming, by the processor, data configured to facilitate adaption of vehicular drive parameters to form adapted vehicular drive parameters at the autonomous vehicle according to the one or more ranges of the vehicular drive parameters; and
transmitting, by the processor, the subset of executable instructions to the autonomous vehicle to update the executable instructions in the autonomy controller to operate in accordance with the adapted vehicular drive parameters.

17. The method of claim 11, wherein analyzing the control signal, the sensor data, and the vehicular drive parameter comprises:
determining, by the processor, one or more values of the control signal, the sensor data, and the vehicular drive parameter associated with the type of the event;
modifying, by the processor, the one or more values of the control signal;
simulating, by the processor, implementation of the modified one or more values of the control signal, the sensor data, and the vehicular drive parameter to test resolution of the type of the event;
identifying, by the processor, a value to resolve the event;
forming, by the processor, an update to a portion of software implementing the autonomy controller; and
causing, by the processor, download of the update to the autonomous vehicle.

18. The method of claim 11, wherein receiving the event data comprises:
receiving, by the processor, the event data in accordance with one or more transmission criteria with which to receive the event data, wherein the one or more transmission criteria include values defining one or more of a cost of transmission, a bandwidth threshold of transmission, a type of communication channel including WiFi communication channels and cellular communication channels.

19. The method of claim 11, wherein receiving the event data comprises:
receiving, by the processor, the event data during a time interval, wherein the time interval comprises one or more of a prior interval of time before the event and subsequent interval of time after the event.

20. An apparatus comprising:
a memory including executable instructions; and
a processor, responsive to executing the executable instructions, that:
receives event data via a communications network from an autonomous vehicle, the event data captured in association with an event that occurred along a path of travel of the autonomous vehicle, the event being detected when a difference between a value of a vehicular drive parameter and a value of a control signal exceeds a threshold, wherein the vehicular drive parameter and the control signal originate from different sources and are used to control driving operations of the autonomous vehicle through one or more control devices of the autonomous vehicle;
extracts sensor data associated with the event;
analyzes the control signal, the sensor data, and the vehicular drive parameter to identify a type of event; and
generates a subset of executable instructions based on the type of event to update executable instructions in an autonomy controller of the autonomous vehicle to alter autonomous operation of the autonomous vehicle for a future trip along the path of travel.

21. The apparatus of claim 20, wherein the vehicular drive parameter comprises one of a degree of wheel angle, an amount of throttle, an amount of brake pressure, and a state of transmission.

22. The apparatus of claim 20, wherein the processor further:
transmits the subset of executable instructions to the autonomous vehicle to update the executable instructions in the autonomy controller.

23. The apparatus of claim 20, wherein the vehicular drive parameter originates from the autonomy controller.

24. The apparatus of claim 23, wherein the control signal originates from human driver intervention.

* * * * *